United States Patent
Rao et al.

(10) Patent No.: US 8,024,568 B2
(45) Date of Patent: Sep. 20, 2011

(54) METHOD AND SYSTEM FOR VERIFICATION OF AN ENDPOINT SECURITY SCAN

(75) Inventors: Goutham Rao, San Jose, CA (US); Lewis McCarthy, Sunnyvale, CA (US); Timothy Ernest Simmons, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1426 days.

(21) Appl. No.: 11/255,311

(22) Filed: Oct. 21, 2005

(65) Prior Publication Data

US 2006/0174115 A1    Aug. 3, 2006

Related U.S. Application Data

(60) Provisional application No. 60/648,669, filed on Jan. 28, 2005.

(51) Int. Cl.
    *H04L 9/32*          (2006.01)
    *G06F 17/00*      (2006.01)
    *H04L 29/06*      (2006.01)

(52) U.S. Cl. ............................................ 713/168; 726/1

(58) Field of Classification Search ........................ None
See application file for complete search history.

(56) References Cited

U.S. PATENT DOCUMENTS

| | | |
|---|---|---|
| 4,779,189 A | 10/1988 | Legvold et al. |
| 5,057,996 A | 10/1991 | Cutler et al. |
| 5,129,084 A | 7/1992 | Kelly, Jr. et al. |
| 5,175,852 A | 12/1992 | Johnson et al. |
| 5,187,790 A | 2/1993 | East et al. |
| 5,202,971 A | 4/1993 | Henson et al. |
| 5,249,290 A | 9/1993 | Heizer |
| 5,297,283 A | 3/1994 | Kelly, Jr. et al. |
| 5,321,841 A | 6/1994 | East et al. |
| 5,341,478 A | 8/1994 | Travis, Jr. et al. |
| 5,418,964 A | 5/1995 | Conner et al. |
| 5,437,025 A | 7/1995 | Bale et al. |
| 5,461,608 A | 10/1995 | Yoshiyama et al. |
| 5,473,599 A | 12/1995 | Li et al. |
| 5,499,343 A | 3/1996 | Pettus |
| 5,504,677 A | 4/1996 | Pollin |

(Continued)

FOREIGN PATENT DOCUMENTS

AU        3403602        5/2002

(Continued)

OTHER PUBLICATIONS

International Searching Authority, International Search Report related to PCT/US05/028606, mailed Feb. 24, 2006 (5 pages).

(Continued)

*Primary Examiner* — Nathan Flynn
*Assistant Examiner* — Trang Doan
(74) *Attorney, Agent, or Firm* — Foley and Lardner LLP; John D. Lanza

(57) ABSTRACT

A method of granting access to resources includes the step of receiving a request from a node to access a resource. A scanning agent is generated to gather information about the node. A key is generated and embedded in the scanning agent. The scanning agent is transmitted to the node and gathers information regarding the node. The scanning agent encrypts the gathered information using the at least one generated key. The encrypted gathered information is received from the scanning agent and decrypted.

22 Claims, 8 Drawing Sheets

U.S. PATENT DOCUMENTS

| | | | |
|---|---|---|---|
| 5,504,814 A | 4/1996 | Miyahara | |
| 5,511,208 A | 4/1996 | Boyles et al. | |
| 5,515,508 A | 5/1996 | Pettus et al. | |
| 5,553,242 A | 9/1996 | Russell et al. | |
| 5,557,346 A | 9/1996 | Lipner et al. | |
| 5,557,748 A | 9/1996 | Norris | |
| 5,557,765 A | 9/1996 | Lipner et al. | |
| 5,561,769 A | 10/1996 | Kumar et al. | |
| 5,586,312 A | 12/1996 | Johnson et al. | |
| 5,590,199 A | 12/1996 | Krajewski, Jr. et al. | |
| 5,596,745 A | 1/1997 | Lai et al. | |
| 5,606,668 A | 2/1997 | Shwed et al. | |
| 5,633,929 A * | 5/1997 | Kaliski, Jr. | 380/286 |
| 5,640,454 A | 6/1997 | Lipner et al. | |
| 5,657,390 A | 8/1997 | Elgamal et al. | |
| 5,701,484 A | 12/1997 | Artsy | |
| 5,706,437 A | 1/1998 | Kirchner et al. | |
| 5,727,249 A | 3/1998 | Pollin | |
| 5,729,734 A | 3/1998 | Parker et al. | |
| 5,734,865 A | 3/1998 | Yu | |
| 5,737,622 A | 4/1998 | Rogers et al. | |
| 5,745,573 A | 4/1998 | Lipner et al. | |
| 5,757,795 A | 5/1998 | Schnell | |
| 5,761,662 A | 6/1998 | Dasan | |
| 5,764,915 A | 6/1998 | Heimsoth et al. | |
| 5,794,207 A | 8/1998 | Walker et al. | |
| 5,802,306 A | 9/1998 | Hunt | |
| 5,828,840 A | 10/1998 | Cowan et al. | |
| 5,835,726 A | 11/1998 | Shwed et al. | |
| 5,838,910 A | 11/1998 | Domenikos et al. | |
| 5,838,916 A | 11/1998 | Domenikos et al. | |
| 5,844,553 A | 12/1998 | Hao et al. | |
| 5,848,410 A | 12/1998 | Walls et al. | |
| 5,860,068 A | 1/1999 | Cook | |
| 5,884,046 A | 3/1999 | Antonov | |
| 5,928,363 A | 7/1999 | Ruvolo | |
| 5,938,733 A | 8/1999 | Heimsoth et al. | |
| 5,951,694 A | 9/1999 | Choquier et al. | |
| 5,956,403 A | 9/1999 | Lipner et al. | |
| 5,960,170 A * | 9/1999 | Chen et al. | 714/38 |
| 5,968,176 A | 10/1999 | Nessett et al. | |
| 5,983,190 A | 11/1999 | Trower, II et al. | |
| 5,983,268 A | 11/1999 | Freivald et al. | |
| 5,987,611 A | 11/1999 | Freund | |
| 5,991,406 A | 11/1999 | Lipner et al. | |
| 5,999,179 A | 12/1999 | Kekic et al. | |
| 6,003,030 A | 12/1999 | Kenner et al. | |
| 6,026,440 A | 2/2000 | Shrader et al. | |
| 6,032,260 A | 2/2000 | Sasmazel et al. | |
| 6,058,431 A | 5/2000 | Srisuresh et al. | |
| 6,085,247 A | 7/2000 | Parsons, Jr. et al. | |
| 6,088,728 A | 7/2000 | Bellemore et al. | |
| 6,108,712 A | 8/2000 | Hayes, Jr. | |
| 6,151,599 A | 11/2000 | Shrader et al. | |
| 6,157,953 A | 12/2000 | Chang et al. | |
| 6,158,007 A | 12/2000 | Moreh et al. | |
| 6,161,126 A | 12/2000 | Wies et al. | |
| 6,199,753 B1 | 3/2001 | Tracy et al. | |
| 6,219,669 B1 | 4/2001 | Haff et al. | |
| 6,223,288 B1 * | 4/2001 | Byrne | 713/190 |
| 6,272,556 B1 | 8/2001 | Gish | |
| 6,272,632 B1 | 8/2001 | Carman et al. | |
| 6,275,942 B1 | 8/2001 | Bernhard et al. | |
| 6,321,337 B1 | 11/2001 | Reshef et al. | |
| 6,339,595 B1 | 1/2002 | Rekhter et al. | |
| 6,377,952 B1 | 4/2002 | Inohara et al. | |
| 6,383,478 B1 | 5/2002 | Prokop et al. | |
| 6,405,219 B2 | 6/2002 | Saether et al. | |
| 6,405,252 B1 | 6/2002 | Gupta et al. | |
| 6,412,007 B1 | 6/2002 | Bui et al. | |
| 6,415,329 B1 | 7/2002 | Gelman et al. | |
| 6,421,726 B1 | 7/2002 | Kenner et al. | |
| 6,442,571 B1 | 8/2002 | Haff et al. | |
| 6,452,915 B1 | 9/2002 | Jorgensen | |
| 6,463,470 B1 | 10/2002 | Mohaban et al. | |
| 6,463,474 B1 | 10/2002 | Fuh et al. | |
| 6,466,984 B1 | 10/2002 | Naveh et al. | |
| 6,470,453 B1 | 10/2002 | Vilhuber | |
| 6,496,935 B1 | 12/2002 | Fink et al. | |
| 6,502,125 B1 | 12/2002 | Kenner et al. | |
| 6,502,131 B1 | 12/2002 | Vaid et al. | |
| 6,516,315 B1 | 2/2003 | Gupta | |
| 6,519,581 B1 | 2/2003 | Hofmann et al. | |
| 6,519,643 B1 | 2/2003 | Foulkes et al. | |
| 6,526,056 B1 | 2/2003 | Rekhter et al. | |
| 6,550,012 B1 | 4/2003 | Villa et al. | |
| 6,553,377 B1 | 4/2003 | Eschelbeck et al. | |
| 6,584,569 B2 | 6/2003 | Reshef et al. | |
| 6,587,878 B1 | 7/2003 | Merriam | |
| 6,609,154 B1 | 8/2003 | Fuh et al. | |
| 6,611,522 B1 | 8/2003 | Zheng et al. | |
| 6,625,643 B1 | 9/2003 | Colby et al. | |
| 6,625,645 B1 | 9/2003 | Van Horne et al. | |
| 6,640,240 B1 | 10/2003 | Hoffman et al. | |
| 6,640,248 B1 | 10/2003 | Jorgensen | |
| 6,643,774 B1 | 11/2003 | McGarvey | |
| 6,658,021 B1 | 12/2003 | Bromley et al. | |
| 6,665,706 B2 | 12/2003 | Kenner et al. | |
| 6,691,232 B1 | 2/2004 | Wood et al. | |
| 6,697,849 B1 | 2/2004 | Carlson | |
| 6,701,432 B1 | 3/2004 | Deng et al. | |
| 6,718,380 B1 | 4/2004 | Mohaban et al. | |
| 6,741,853 B1 | 5/2004 | Jiang et al. | |
| 6,766,454 B1 * | 7/2004 | Riggins | 713/185 |
| 6,766,457 B1 | 7/2004 | Baisley | |
| 6,772,203 B1 | 8/2004 | Feiertag et al. | |
| 6,772,347 B1 | 8/2004 | Xie et al. | |
| 6,772,350 B1 | 8/2004 | Belani et al. | |
| 6,799,221 B1 | 9/2004 | Kenner et al. | |
| 6,850,943 B2 | 2/2005 | Teixeira et al. | |
| 6,856,651 B2 | 2/2005 | Singh | |
| 6,868,451 B1 | 3/2005 | Peacock | |
| 6,871,346 B1 | 3/2005 | Kumbalimutt et al. | |
| 6,873,988 B2 | 3/2005 | Herrmann et al. | |
| 6,880,005 B1 | 4/2005 | Bell et al. | |
| 6,901,072 B1 | 5/2005 | Wong | |
| 6,901,075 B1 | 5/2005 | Baron | |
| 6,914,886 B2 | 7/2005 | Peles et al. | |
| 6,920,502 B2 | 7/2005 | Araujo et al. | |
| 6,963,981 B1 | 11/2005 | Bailey et al. | |
| 6,993,016 B1 | 1/2006 | Liva et al. | |
| 7,036,051 B1 | 4/2006 | Fernandes | |
| 7,069,434 B1 * | 6/2006 | Ilnicki et al. | 713/153 |
| 7,100,054 B2 * | 8/2006 | Wenisch et al. | 713/185 |
| 7,100,195 B1 | 8/2006 | Underwood | |
| 7,102,996 B1 | 9/2006 | Amdahl et al. | |
| 7,113,962 B1 | 9/2006 | Kee et al. | |
| 7,114,180 B1 | 9/2006 | DeCaprio | |
| 7,117,359 B2 | 10/2006 | Wood et al. | |
| 7,120,666 B2 | 10/2006 | McCanne et al. | |
| 7,136,645 B2 | 11/2006 | Hanson et al. | |
| 7,165,222 B1 | 1/2007 | Suzuki | |
| 7,246,230 B2 | 7/2007 | Stanko | |
| 7,260,840 B2 | 8/2007 | Swander et al. | |
| 7,269,664 B2 | 9/2007 | Hutsch et al. | |
| 7,293,099 B1 | 11/2007 | Kalajan | |
| 7,353,533 B2 | 4/2008 | Wright et al. | |
| 7,363,347 B2 | 4/2008 | Thomas | |
| 7,522,732 B2 * | 4/2009 | Whitehead | 380/286 |
| 2001/0023421 A1 | 9/2001 | Numao et al. | |
| 2001/0037387 A1 | 11/2001 | Gilde et al. | |
| 2001/0047406 A1 | 11/2001 | Araujo et al. | |
| 2002/0032725 A1 | 3/2002 | Araujo et al. | |
| 2002/0035451 A1 | 3/2002 | Rothermel | |
| 2002/0049608 A1 | 4/2002 | Hartsell et al. | |
| 2002/0049841 A1 | 4/2002 | Johnson et al. | |
| 2002/0059274 A1 | 5/2002 | Hartsell et al. | |
| 2002/0065864 A1 | 5/2002 | Hartsell et al. | |
| 2002/0095400 A1 | 7/2002 | Johnson et al. | |
| 2002/0105972 A1 | 8/2002 | Richter et al. | |
| 2002/0107903 A1 | 8/2002 | Richter et al. | |
| 2002/0107962 A1 | 8/2002 | Richter et al. | |
| 2002/0107971 A1 | 8/2002 | Bailey et al. | |
| 2002/0107989 A1 | 8/2002 | Johnson et al. | |
| 2002/0107990 A1 | 8/2002 | Johnson et al. | |
| 2002/0108059 A1 | 8/2002 | Canion et al. | |
| 2002/0111972 A1 | 8/2002 | Lynch et al. | |

| | | |
|---|---|---|
| 2002/0116452 A1 | 8/2002 | Johnson et al. |
| 2002/0133593 A1 | 9/2002 | Johnson et al. |
| 2002/0133723 A1 | 9/2002 | Tait |
| 2002/0138618 A1 | 9/2002 | Szabo |
| 2002/0147927 A1 | 10/2002 | Tait |
| 2002/0152373 A1 | 10/2002 | Sun et al. |
| 2002/0165971 A1 | 11/2002 | Baron |
| 2002/0169887 A1 | 11/2002 | MeLampy et al. |
| 2002/0174215 A1 | 11/2002 | Schaefer |
| 2002/0174227 A1 | 11/2002 | Hartsell et al. |
| 2002/0184224 A1 | 12/2002 | Haff et al. |
| 2003/0004950 A1 | 1/2003 | Wils et al. |
| 2003/0046586 A1 | 3/2003 | Bheemarasetti et al. |
| 2003/0046587 A1 | 3/2003 | Bheemarasetti et al. |
| 2003/0051130 A1 | 3/2003 | MeLampy et al. |
| 2003/0055962 A1 | 3/2003 | Freund et al. |
| 2003/0067874 A1 | 4/2003 | See et al. |
| 2003/0084165 A1 | 5/2003 | Kjellberg et al. |
| 2003/0105604 A1 | 6/2003 | Ash et al. |
| 2003/0110192 A1 | 6/2003 | Valente et al. |
| 2003/0131079 A1 | 7/2003 | Neale et al. |
| 2003/0131100 A1* | 7/2003 | Godon et al. ................ 709/224 |
| 2003/0135626 A1 | 7/2003 | Ray et al. |
| 2003/0145222 A1 | 7/2003 | Gittler et al. |
| 2003/0154239 A1 | 8/2003 | Davis et al. |
| 2003/0163693 A1 | 8/2003 | Medvinsky |
| 2003/0172138 A1 | 9/2003 | McCormack et al. |
| 2003/0177389 A1 | 9/2003 | Albert et al. |
| 2003/0182423 A1 | 9/2003 | Shafir et al. |
| 2003/0182431 A1 | 9/2003 | Sturniolo et al. |
| 2003/0188001 A1 | 10/2003 | Eisenberg et al. |
| 2003/0188193 A1 | 10/2003 | Venkataramappa |
| 2003/0191799 A1 | 10/2003 | Araujo et al. |
| 2003/0191971 A1 | 10/2003 | Klensin et al. |
| 2003/0195759 A1 | 10/2003 | Glassco et al. |
| 2003/0198189 A1 | 10/2003 | Roberts et al. |
| 2003/0200234 A1 | 10/2003 | Koppich et al. |
| 2003/0202480 A1 | 10/2003 | Swami |
| 2003/0212776 A1 | 11/2003 | Roberts et al. |
| 2003/0212817 A1 | 11/2003 | Matthews et al. |
| 2003/0217105 A1 | 11/2003 | Zircher et al. |
| 2003/0223361 A1 | 12/2003 | Hussain et al. |
| 2003/0229718 A1 | 12/2003 | Tock et al. |
| 2003/0233541 A1 | 12/2003 | Fowler et al. |
| 2003/0233581 A1 | 12/2003 | Reshef et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0010601 A1 | 1/2004 | Afergan et al. |
| 2004/0010621 A1 | 1/2004 | Afergan et al. |
| 2004/0039594 A1 | 2/2004 | Narasimhan et al. |
| 2004/0039827 A1 | 2/2004 | Thomas et al. |
| 2004/0049515 A1 | 3/2004 | Haff et al. |
| 2004/0073512 A1 | 4/2004 | Maung |
| 2004/0078621 A1 | 4/2004 | Talaugon et al. |
| 2004/0078772 A1 | 4/2004 | Balay et al. |
| 2004/0095934 A1 | 5/2004 | Cheng et al. |
| 2004/0107360 A1 | 6/2004 | Herrmann et al. |
| 2004/0111642 A1 | 6/2004 | Peles |
| 2004/0125756 A1 | 7/2004 | Lepore et al. |
| 2004/0131042 A1 | 7/2004 | Lillie et al. |
| 2004/0139178 A1* | 7/2004 | Mendez et al. ............... 709/220 |
| 2004/0153606 A1 | 8/2004 | Schott |
| 2004/0158429 A1 | 8/2004 | Bary et al. |
| 2004/0162876 A1 | 8/2004 | Kohavi |
| 2004/0177247 A1 | 9/2004 | Peles |
| 2004/0210320 A1 | 10/2004 | Pandya |
| 2004/0210771 A1 | 10/2004 | Wood et al. |
| 2004/0215826 A1 | 10/2004 | Pfitzner |
| 2004/0250124 A1 | 12/2004 | Chesla et al. |
| 2004/0255154 A1 | 12/2004 | Kwan et al. |
| 2004/0258003 A1 | 12/2004 | Kokot et al. |
| 2004/0268361 A1 | 12/2004 | Schaefer |
| 2005/0004942 A1 | 1/2005 | Madsen et al. |
| 2005/0015601 A1 | 1/2005 | Tabi |
| 2005/0025125 A1 | 2/2005 | Kwan |
| 2005/0044089 A1 | 2/2005 | Wu et al. |
| 2005/0044108 A1 | 2/2005 | Shah et al. |
| 2005/0050053 A1 | 3/2005 | Thompson |
| 2005/0050362 A1 | 3/2005 | Peles |
| 2005/0055570 A1 | 3/2005 | Kwan et al. |
| 2005/0063083 A1 | 3/2005 | Dart et al. |
| 2005/0063519 A1 | 3/2005 | James |
| 2005/0066163 A1 | 3/2005 | Ikenoya |
| 2005/0071652 A1* | 3/2005 | de Jong ........................ 713/189 |
| 2005/0074126 A1 | 4/2005 | Stanko |
| 2005/0086206 A1 | 4/2005 | Balasubramanian et al. |
| 2005/0120054 A1 | 6/2005 | Shulman et al. |
| 2005/0125663 A1 | 6/2005 | Funk |
| 2005/0132030 A1 | 6/2005 | Hopen et al. |
| 2005/0144481 A1 | 6/2005 | Hopen et al. |
| 2005/0165928 A1 | 7/2005 | Shu et al. |
| 2005/0188215 A1 | 8/2005 | Shulman et al. |
| 2005/0195835 A1 | 9/2005 | Savage et al. |
| 2005/0234852 A1 | 10/2005 | Coramutla |
| 2005/0251573 A1* | 11/2005 | Merkow et al. ............... 709/226 |
| 2005/0254652 A1* | 11/2005 | Engler et al. .................. 380/270 |
| 2005/0262063 A1 | 11/2005 | Conboy et al. |
| 2006/0004662 A1 | 1/2006 | Nadalin et al. |
| 2006/0020937 A1 | 1/2006 | Schaefer |
| 2006/0029016 A1 | 2/2006 | Peles |
| 2006/0036570 A1 | 2/2006 | Schaefer et al. |
| 2006/0050703 A1 | 3/2006 | Foss |
| 2006/0069912 A1* | 3/2006 | Zheng et al. .................. 713/151 |
| 2006/0072755 A1 | 4/2006 | Oskari |
| 2006/0075463 A1* | 4/2006 | Braddy et al. ..................... 726/1 |
| 2006/0190455 A1 | 8/2006 | Braddy et al. |
| 2006/0200859 A1 | 9/2006 | England et al. |
| 2006/0206931 A1 | 9/2006 | Dillaway et al. |
| 2007/0061871 A1* | 3/2007 | Simpkins et al. ................. 726/4 |
| 2007/0101418 A1 | 5/2007 | Wood et al. |
| 2008/0086564 A1 | 4/2008 | Putman et al. |

FOREIGN PATENT DOCUMENTS

| | | |
|---|---|---|
| CA | 2307008 | 10/2000 |
| CA | 2421609 | 3/2002 |
| EP | 0 442 839 A2 | 8/1991 |
| EP | 0 643 514 A2 | 3/1995 |
| EP | 0863453 | 9/1998 |
| EP | 0927921 | 7/1999 |
| EP | 1047239 | 10/2000 |
| EP | 1049306 | 11/2000 |
| EP | 1289225 | 3/2003 |
| EP | 1330705 | 7/2003 |
| EP | 1364296 | 11/2003 |
| EP | 1388812 | 2/2004 |
| JP | 2000307650 | 11/2000 |
| JP | 6332782 | 2/2004 |
| JP | 2004509539 | 3/2004 |
| WO | WO-99/60462 | 11/1999 |
| WO | WO-0051290 | 8/2000 |
| WO | WO-0062507 | 10/2000 |
| WO | WO-0137517 | 5/2001 |
| WO | WO-0175632 | 10/2001 |
| WO | WO-02/23362 | 3/2002 |
| WO | WO-0223362 | 3/2002 |
| WO | WO-02/37267 | 5/2002 |
| WO | WO-02/39221 | 5/2002 |
| WO | WO-02/39260 | 5/2002 |
| WO | WO-02/39261 | 5/2002 |
| WO | WO-02/39262 | 5/2002 |
| WO | WO-02/39263 | 5/2002 |
| WO | WO-02/39264 | 5/2002 |
| WO | WO-02/39275 | 5/2002 |
| WO | WO-02/39276 | 5/2002 |
| WO | WO-02/39301 | 5/2002 |
| WO | WO-02/39666 | 5/2002 |
| WO | WO-02/39693 | 5/2002 |
| WO | WO-02/39695 | 5/2002 |
| WO | WO-02/41575 | 5/2002 |
| WO | WO-02/42922 | 5/2002 |
| WO | WO-02/43320 | 5/2002 |
| WO | WO-02/43364 | 5/2002 |
| WO | WO-0237267 | 5/2002 |
| WO | WO-02/46925 | 6/2002 |
| WO | WO-02/46944 | 6/2002 |
| WO | WO-02/46945 | 6/2002 |
| WO | WO-02/058349 | 7/2002 |

| | | |
|---|---|---|
| WO | WO-02/069604 | 9/2002 |
| WO | WO-02/093369 | 11/2002 |
| WO | WO-02/103521 | 12/2002 |
| WO | WO-02103521 A1 | 12/2002 |
| WO | WO-2004003879 | 1/2004 |
| WO | WO-2004006041 | 1/2004 |
| WO | WO-2004017601 | 2/2004 |
| WO | WO-2004049672 | 6/2004 |
| WO | WO-2004051964 | 6/2004 |
| WO | WO-2004066278 | 8/2004 |
| WO | WO-2004090672 | 10/2004 |
| WO | WO-2005024550 | 3/2005 |
| WO | WO-2005024567 | 3/2005 |
| WO | WO-2005024665 | 3/2005 |
| WO | WO-2005029313 | 3/2005 |
| WO | WO-2005029363 | 3/2005 |
| WO | WO-2005074232 | 8/2005 |
| WO | WO-2005084232 | 9/2005 |
| WO | WO-2006012533 | 2/2006 |
| WO | WO-2006017388 | 2/2006 |

OTHER PUBLICATIONS

International Searching Authority, International preliminary report on patentability to PCT/US05/028606, issued Apr. 3, 2007 (10 pages).

Sirbu, et al., "Distributed authentication in Kerberos using public key cryptograph," Proc. 1997 Symposium on Network and Distributed Systems Security (SNDSS'97), 134-141, IEEE CS Press, 1997.

Perkins et al., Route Optimization in Mobile IP, Internet draft, work in progress, Sep. 2001.

Simon et al., "A Cryptographic Protocol to Obtain Secure Communications in Extended Ethernet Environment," Proc. 17th Conf. on Local Computer Networks, 254-261, IEEE CS Press, 1992.

Neuman et al., The Kerberos Network Authentication Service (V5), Internet draft, work in progress, Sep. 2004.

Allison, Bridget et al., "File System Security: Secure Network Data Sharing for NT and UNIX," in Network Appliance, Inc. Tech Library pp. 16 pgs. Jan. 1, 1998.

Anonymous, "Health Canada Takes Its Network Pulse," Communications News, 48, Oct. 2001, available at http://www.findarticles.com/p/articles/mi_m0DUD/is_5_23/ai_86039142.

Anonymous, "Multiple Platforms Bring Multiple Challenges," Communications News, 56, Oct. 2001, available at http://www.findarticles.com/p/articles/mi_m0CMN/is_10_38/ai_79370488.

Anonymous, "Remote Access," Secure Computing, 47-60, Oct. 1997.

Antonoff, M., "Writing in a Spreadsheet," Personal Computing, 51-54, 1987.

Ao et al., "A Hierarchical Policy Specification Language, and Enforcement Mechanism, for Governing Digital Enterprises", 3rd IEEE International Workshop on Policies for Distributed Systems and Networks (Policy 2002), 38-49, IEEE CS Press, 2002, available at http://www.cs.rutgers.edu/~tdnguyen/pubs/ao-policy-2002.pdf.

Back et al., "Contracts, Games and Refinement," TUCS Technical Report No. 138, Turku Centre for Computer Science, 1-15, Nov. 1997.

Beers, C., "McAfee Shores Up Your Defenses," Network Computing, 38, Jun. 2003, available at http://www.networkcomputing.com/1412/1412sp3.html.

Bird, T., "Reduce the Threat from Computers," Communications News, 36, 38-39, Mar. 2005, available at http://www.comnews.com/stories/articles/0305/0305reduce_threat.htm.

Brekne, T., "Mobile Agents and (In-)Security," Telektronikk, 34-46, 2000.

Carvalho et al., "Supporting Flexible Data Feeds in Dynamic Sensor Grids Through Mobile Agents," Lecture Notes in Computer Science vol. 2535, Proc. 6th International Conference on Mobile Agents (MA 2002), 171-185, Springer-Verlag, Germany, 2002.

Cheng et al., "Adjusting the Autonomy of Collections of Agents in Multiagent Systems," Lecture Notes In Computer Science vol. 3501, 33-37, Advances in Artificial Intelligence: Proc. 18th Conference of the Canadian Society for Computational Studies of Intelligence (Canadian AI 2005), Springer-Verlag, Germany, 2005.

Corradi et al., "Policy-Driven Management of Agent Systems," Lecture Notes in Computer Science vol. 1995, Policies for Distributed Systems and Networks: Proc. International Workshop (Policy 2001), 214-229, Springer-Verlag, Germany, 2001.

Dulay et al., "A Policy Deployment Model for the Ponder Language," Proc. IEEE/IFIP International Symposium on Integrated Network Management (IM 2001), 529-543, Seattle, Washington, USA, IEEE Press, 2001.

Esposito, A. et al., "Integrating Concurrency Control and Distributed Data into Workflow Frameworks: An Actor Model Perspective," 2000 IEEE International Conference on Systems, Man, and Cybernetics, vol. 3, 2110-2114, IEEE Press, 2000.

Feldman, M., "Enterprise Wrappers for Information Assurance," Proc. DARPA Information Survivability Conference and Exposition (DISCEX '03), IEEE Press, 2003.

Fratto, M., "Hammering Out a Secure Framework," Network Computing, 79-80, 82, 84-87, 2000, available at http://www.networkcomputing.com/1101/1101f3.html.

Funk Software, "Funk Software's Endpoint Assurance Solution. The Secure Product Foundation for Endpoint Integrity," 2005, available at: http://www.juniper.net/welcome_funk.html.

Graniero, P.A. et al., "Investigating the Role of Fuzzy Sets in a Spatial Modeling Framework," Proc. 9th IFSA World Congress and 20th NAFIPS International Conference, 2370-2375, IEEE Press 2001.

Guy III, E.T., "An Introduction to the CAD Framework Initiative," Electro 1992 Conference Record, 78-83, Massachusetts, May 1992.

International Searching Authority, "International Search Report," PCT Application No. PCT/US05/028605, mailed on Jan. 18, 2005, 7 pgs.

International Searching Authority, "Written Opinion," PCT Application No. PCT/ US05/028605, mailed on Jan. 18, 2006, 7 pgs.

International Searching Authority, "Partial International Annexed to Invitation to Pay fees," PCT Application No. PCT/ US05/028607, mailed on Dec. 14, 2005, 7 pgs.

Jin, H. et al., "A Distributed Dynamic µFirewall Architecture With Mobile Agents and KeyNote Trust Management System," Lecture Notes in Computer Science, vol. 2513, Proc. 4th International Conference on Information and Communications Security, (ICICS 2002), 13-24, Springer-Verlag, Germany, 2002.

Jun, M. et al., "Application of Mobile Scanning Agent in the Network Security," J. of Systems Engineering and Electronics, 15(3): 371-376, 2004.

Juniper Networks, "Juniper Networks Infranet Controllers Provide Unified Access Control for all Users throughout Your Network," (Oct. 2005), available at: http://www.juniper.net/products/ua/dsheet/100137.pdf.

Keromytis, A.D. et al., "Transparent Network Security Policy Enforcement," Proc. USENIX Technical Conference, 215-225, San Diego, CA, USA, 2000.

Kim, S.C. et al., "Study of Security Management System Based on Client/ Server Model," 1403-1408, IEEE Press, 1999.

Klein, D., "Developing Applications with a UIMS," Proc. USENIX Applications Development Symposium, 37-56, 1994.

Kosar, T. et al., "A Framework for Reliable and Efficient Data Placement in Distributed Computing Systems," Journal of Parallel and Distributed Computing, vol. 65 (10), 1146-1157, Academic Press, Inc., Orlando, FL, USA, 2005.

Krief, F. et al., "An Intelligent Policy-Based Networking Environment for Dynamic Negotiation, Provisioning and Control of QoS," IFIP TC6/WG6.2 & WG6.7 Conference on Network Control and Engineering for QoS, Security and Mobility, (Net-Con 2002), 285-290, Kluwer Academic Publishers, 2002.

Law, K.L.E. et al., "Performance of a Multi-Tiered Policy-Based Management System," IFIP TC6/WG6.2 & WG6.7 Conference on Network Control and Engineering for QoS, Security and Mobility, (Net-Con 2002), 203-214, Kluwer Academic Publishers, 2002.

Law, K.L.E. et al., "Policy-Based Management With Active Networks," IFIP TC6/WG6.2 & WG6.7 Conference on Network Control and Engineering for QoS, Security and Mobility, (Net-Con 2002), 129-140, Kluwer Academic Publishers, 2002.

Law, K.L.E. et al., "UPM: Unified Policy-Based Network Management," Proc. SPIE, (ITCom 2001), vol. 4523, 326-337, Denver, CO, USA, 2001.

Lee, D.W. et al., "Managing Fault Tolerance Information in Multi-Agents Based Distributed Systems," Lecture Notes in Computer Science, vol. 2690, Intelligent Data Engineering and Automated Learning, (IDEAL 2003), 104-108, Springer-Verlag, Germany, 2003.
Maes, S. et al., "Identifiability of Causal Effects in a Multi-Agent Causal Model," IEEE/WIC International Conference on Intelligent Agent Technology, (IAT'03), 605, IEEE Press, 2003.
Mahler, R.P. et al. "Technologies for Unified Collection and Control of UCAVs," Proc. of SPIE vol. 4729, 90-101, 2002.
Matsuura, S. et al., "An Extension of ECA Architecture and its Application to HTML Document Browsing," IEEE International Conference on Systems, Man, and Cybernetics, vol. 1, 738-743, IEEE Press 1999.
Maxim, M. and Venugopal, A., "Securing Agent Based Architectures," Lecture Notes in Computer Science vol. 2480, Proc. First International Conference on Engineering and Deployment of Cooperative Information Systems, 220-231, Springer-Verlag, Germany, 2002.
McAfee System Protection Solutions, "Enforcing Endpoint Policies for Network Access Selecting the Right Solution for your Environment," 2005, available at: http://mcafee.com/us/local_content/white_papers/wp_mpe_securingyournetwork.pdf.
McAfee System Protection Solutions, "McAfee Policy Enforcer," 2005, available at: http://www.mcafee.com/us/local_content/datasheets/ds_policy_enforcer.pdf.
Meyer, B. et al., "Towards Implementing Policy-Based Systems Management," Distrib. Syst. Engng vol. 3, 78-85, The Institution of Electrical Engineers and IOP Publishing, Ltd., 1996, available at http://www.mobile.ifi.lmu.de/common/Literatur/MNMPub/Publikationen/map96/PDF-Version/map96.pdf.
Molta, D., "Odyssey Makes Wireless LANs a Safe Trip," Networking Computing, 24, 26, 2002, available at http://www.networkcomputing.com/1311/1311sp2.html.
Montanari, R. et al., "Context-Based Security Management for Multi-Agent Systems," Proc. Second IEEE Symposium on Multi-Agent Security and Survivability (MAS&S 2005), IEEE Press, 2005.
Page, S.E., "Self Organization and Coordination," Computational Economics, vol. 18, 25-48, Kluwer Academic Publishers, 2001.
Palmer, D. et al., "Decentralized Cooperative Auction for Multiple Agent Task Allocation Using Synchronized Random Number Generators," Proc. IEEE/RSJ International Conference on Intelligent Robots and Systems, 1963-1968, IEEE Press, 2003.
Patwardhan, A. et al., "Enforcing Policies in Pervasive Environments," First Annual International Conference on Mobile and Ubiquitous Systems: Networking and Services, (MobiQuitous '04), 299-308, IEEE Press, 2004.
Randic, M. et al., "Object by Value Transfer Mechanisms for Obligation Policy Enforcement Object Loading," Proc. 12th IEEE Mediterranean Electrotechnical Conference, (Melecon 2004), IEEE Press, 2004.
Suri, N. et al., "DAML-Based Policy Enforcement for Semantic Data Transformation and Filtering in Multi-Agent Systems," Lecture Notes in Computer Science, vol. 2691, Proc. 2nd International Joint Conference on Autonomous Agents and Multi-Agent Systems, (AAMAS 2003), 1132-1133, ACM Press, New York, USA, 2003.
Suri, N. et al., "Enforcement of Communications Policies in Software Agent Systems through Mobile Code," Proc. 4th International Workshop on Policies for Distributed Systems and Networks, (Policy'03), 247, IEEE Press, 2003.
Takahaski, K. et al., "Integrating Heterogeneous and Distributed Information by Linking it to Structured Information as an 'Information Integration Directory'," J81-D-I(5): 443-450, 1998.
TCG Published, "TCG Trusted Network Connect TNC Architecture for Interoperability," 2005, available at: https://www.trustedcomputinggroup.org/groups/network/TNC_Architecture_v1_0_r4.pdf.
TCG Published, "TCG Trusted Network Connect TNC IF-IMC," 2005, available at: https://www.trustedcomputinggroup.org/groups/network/TNC_IFIMC_v1_0_r3.pdf.
TCG Published, "TCG Trusted Network Connect TNC IF-IMV," 2005, available at: https://www.trustedcomputinggroup.org/groups/network/TNC_IFIMV_v1_0_r3.pdf.

Trusted Computing Group, "Trusted Network Connect to Ensure Endpoint Integrity," 2005, available at: https://www.trustedcomputinggroup.org/groups/network/TNC_NI-collateral_10_may_(2).pdf.
Trusted Computing Group, "Trusted Network Connect Open Standards for Integrity-Based Network Access Control," 2005, available at: https://www.trustedcomputinggroup.org/groups/network/Open_Standards_for_IntegrityBased_AccessControl.pdf.
Uszok, A. et al., "KAoS Policy and Domain Services: Toward a Description-Logic Approach to Policy Representation, Deconfliction, and Enforcement," Proc. 4th International Workshop on Policies for Distributed Systems and Networks, (Policy'03), 93, IEEE Press, 2003.
Wang, D. et al., "Study oOn SOAP-Based Mobile Agent Techniques," Lecture Notes in Computer Science, vol. 2480, Proc. First International Conference on Engineering and Deployment of Cooperative Information Systems, 208-219, Springer-Verlag, Germany, 2002.
Wittner, O. and Helvik, B.E., "Distributed Soft Policy Enforcement by Swarm Intelligence; Application to Loadsharing and Protection," Ann. Telecommun., vol. 59, No. 1-2, 10-24, 2004.
Xia, H. et al., "Using Secure Coprocessors to Protect Access to Enterprise Networks," Lecture Notes in Computer Science, vol. 3462, Proc. International IFIP-TC6 Networking Conference, (Networking 2005), Springer-Verlag, Germany, 2005, available at http://www.cs.pitt.edu/~jcb/papers/net2005.pdf.
Xu, Y. et al., "An Agent-Based Data Collection Architecture for Distributed Simulations," Int'l J. of Modelling and Simulation, 24(2), 55-64, 2004.
Yang, K. et al., "Service and Network Management Middleware for Cooperative Information Systems through Policies and Mobile Agents," Lecture Notes in Computer Science, vol. 2480, Proc. First International Conference on Engineering and Deployment of Cooperative Information Systems, 232-246, Springer-Verlag, Germany, 2002.
Yang, S., "Setting up a Secure Public Workstation," 153-162.
Yocom, B., et al., "A First Look at Wireless Security Products," Business Comm. Review, 36-48, Oct. 2003.
Yu, Y. et al., "Quality of Service Policy Control in Virtual Private Networks," Proc. of SPIE, vol. 5282, 1055-1060, 2003.
Zhang, Y. and You, J., "An RBAC Based Policy Enforcement Coordination Model in Internet Environment," Lecture Notes in Computer Science, vol. 2480, Proc. First International Conference on Engineering and Deployment of Cooperative Information Systems, 466-477, Springer-Verlag, Germany, 2002.
Juniper Networks NetScreen-SA 5000 Series. Spec Sheet Access Appliances, Juniper Networks, Sunnyvale, CA., 4 pages.
International Searching Authority, "International Search Report," PCT Application No. PCT/US05/028607, mailed on Mar. 31, 2006, 10 pgs.
International Searching Authority, "Written Opinion," PCT Application No. PCT/ US05/028607, mailed on Mar. 31, 2006, 11 pgs.
European Patent Office Examination Report dated Aug. 17, 2007 for Application No. 05798714. 3 pages.
Office Action for U.S. Appl. No. 10/711,729 dated Jun. 6, 2008.
Administrator's Guide, Citrix NFuse Classic. Version 1.7, Citrix Systems Inc.
Citrix MetaFrame XP Security Standards and Deployment Scenarios. MetaFrame XP Server for Windows with Feature Release 3. Citrix Systems Inc.
European Search Report for European Application No. 08 00 9196, date of completion Oct. 23, 2008. (7 pages).
Tierling, E.: "Gezaehmtes Monster", CT Magazin Fuer Computer TEchnik, Verlag Heinz Heise GMBH., Hannover, DE, No. 10, 1998, pp. 226-228, 230, 23, XP000740851, ISSN: 0724-8679.
Anonymous: "Citrix Metaframe 1.8—Backgrounder", Internet Publication, Apr. 24, 1999 (1999-04-240, XP002217973.
Office action for U.S. Appl. No. 10/711,731 dated Apr. 17, 2009.
Advisory action for U.S. Appl. No. 10/711,731 dated Jan. 21, 2009.
Office action for U.S. Appl. No. 10/711,731 dated Oct. 20, 2008.
Office action for U.S. Appl. No. 10/711,731 dated Jun. 17, 2008.
Exam Report for EP appl 07115385.9 dated May 23, 2008.

Restriction requirement for U.S. Appl. No. 10/956,764 dated Apr. 1, 2009.
Office Action for U.S. Appl. No. 10/956,764 dated Oct. 8, 2008.
Office Action for U.S. Appl. No. 10/711,730 dated Apr. 28, 2009.
Office Action for U.S. Appl. No. 10/711,730 dated Dec. 11, 2008.
Office Action for U.S. Appl. No. 10/711,730 dated Jun. 27, 2008.
Office Action for U.S. Appl. No. 11/272,598 dated Oct. 7, 2008.
Exam Report for EP appl 05798714.1 dated May 19, 2009.
Office Action for U.S. Appl. No. 10/956,764 dated Jul. 7, 2009.
Office Action for U.S. Appl. No. 10/956,835 dated Sep. 1, 2009.
Office Action for U.S. Appl. No. 11/272,598 dated Jul. 23, 2009.
Citrix Metaframe XPa for windows 2002.
Office Action for AU appln 2005292566 dated May 6, 2009.
Office Action for U.S. Appl. No. 10/711,729 dated Sep. 4, 2009.
Office Action for U.S. Appl. No. 10/711,731 dated Sep. 21, 2009.
Office Action for CN appln 2005800470611 dated Jul. 17, 2009.
Office Action for U.S. Appl. No. 10/956,835 dated Feb. 18, 2010.
Office Action for AU appln 2005292568 dated Apr. 27, 2010.
Office Action for U.S. Appl. No. 10/956,764 dated Mar. 4, 2010.
Notice of Allowance for U.S. Appl. No. 10/711,730.
Notice of Allowance for U.S. Appl. No. 10/711,729.
Office Action for CN appln 20050041052.2 dated Nov. 27, 2009.
Office Action for U.S. Appl. No. 10/711,731 dated Jan. 6, 2010.
Notice of Allowance for U.S. Appl. No. 10/956,764 dated Sep. 21, 2010.
Notice of Allowance for U.S. Appl. No. 10/956,832 dated Sep. 21, 2010.
Office Action for AU appln 2005292566 dated Jun. 23, 2010.
Office Action for CN appln 2005800470611 dated Jul. 1, 2010.

* cited by examiner

METHOD AND SYSTEM FOR VERIFICATION OF AN ENDPOINT SECURITY SCAN

RELATED APPLICATIONS

The present application claims priority to U.S. Provisional Patent Application No. 60/648,669, entitled "Methods and Systems for Verification of an Endpoint Security Scan" filed Jan. 28, 2005, which is incorporated herein by reference.

FIELD OF THE INVENTION

The present invention relates to a method and system for endpoint security and, in particular, to a method and system for verification of an endpoint security scan.

BACKGROUND OF THE INVENTION

Before an endpoint gains access to corporate enterprise network infrastructure and resources, it is increasingly becoming necessary to determine that the endpoint has undergone host security checks and audits to verify that it meets corporate information technology policies. Examples of such checks include, without limitation, verifying that the anti-virus software on the endpoint is up to date, that the latest operating system patches have been installed and that no malicious software is executing on the endpoint. Performing these checks minimizes the infection of other connected corporate assets by a compromised endpoint.

Conventional solutions typically deploy software to collect data and evidence from an endpoint. The collected data is presented to an access infrastructure or other security gateway, which then determines what the endpoint may access. A problem with these approaches is that they typically rely on the assumption that the data from the endpoint has not been corrupted or compromised by a malicious attack, such as a man-in-the-middle attack. Corrupted endpoints can "spoof" endpoint evidence collection and report a favorable result even though the endpoint may actually be in violation of corporate policies. Additionally, a large number of corporate attacks come from trusted users, for a variety of social reasons. These attacks exploit solutions that rely on compliant end users by reporting false evidence. This creates information technology threats and creates a false sense of security.

SUMMARY OF THE INVENTION

The present invention relates to a method of and system for verification of an endpoint security scan. A scanning agent collecting evidence about the endpoint includes an embedded encryption key which is use to encrypt collected evidence. Execution of the scanning agent is required to access the key. Encrypting the collected evidence with the proper key verifies that the appropriate scanning agent was executed. Execution of the appropriate scanning agent verifies accuracy of the collected evidence and prevents manipulation of the scanning agent, either by a malicious "man in the middle" or a user.

In one aspect, the invention relates to a method of granting access to resources. A request is received from a node to access a resource. A scanning agent is generated to gather information about the node. At least one key is generated and embedded in the scanning agent. The scanning agent is transmitted to the node and gathers information about the node. The scanning agent encrypts the gathered information using the at least one generated key. The encrypted gathered information is received from the scanning agent and decrypted.

In one embodiment, the generated scanning agent comprises a selection of a subset of scan routines chosen from a plurality of available scan routines. In another embodiment, the scanning agent may comprise obfuscated program code.

In another aspect, the invention relates to a system for granting access to resources by an access gateway. The system includes a receiver, an agent constructor, a key generator, an encryption function generator, and a decryptor. The receiver receives a request to access a resource. The agent constructor generates a scanning agent for gathering information about the requestor. The key generator, which is in communication with the receiver and the agent constructor, generates at least one key. The encryption function generator, in communication with the agent constructor and the key generator, embeds the at least one generated key in the generated scanning agent. The decryptor, in communication with the receiver and the key generator, receives encrypted gathered information about the requestor and decrypts the gathered information.

In one embodiment, the agent constructor selects a subset of a plurality of scan routines for execution on the requestor. In another embodiment, the agent constructor further comprises a transmitter for transmitting the generated scanning agent to the requestor. In still another embodiment, the receiver receives encrypted gathered information from the scanning agent and transmits the received encrypted gathered information to the decryptor.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE INVENTION

Figure 1A:
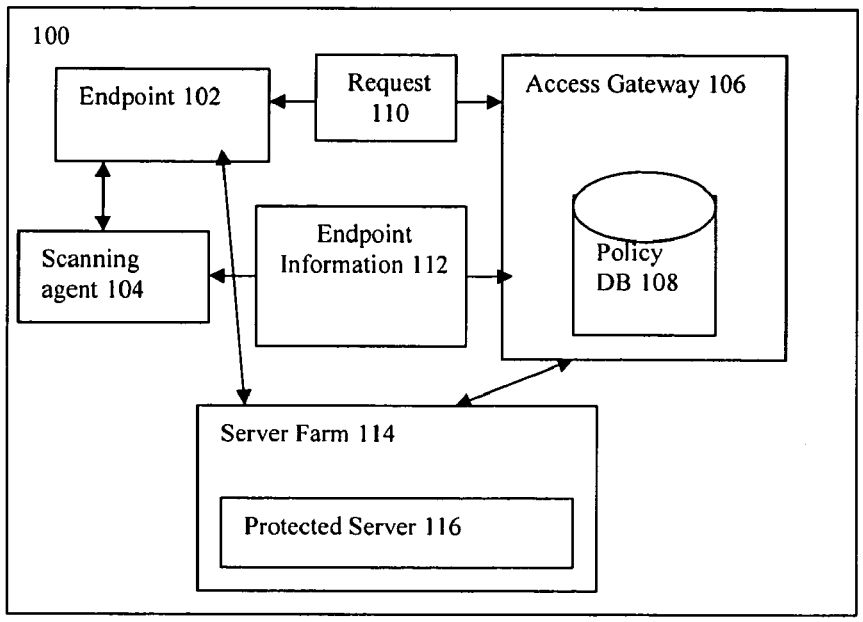
FIG. 1A is a block diagram depicting one embodiment of a computer network constructed in accordance with the invention.

Referring now to FIG. 1A, one embodiment of a computer network 100 constructed in accordance with the invention is depicted, which includes an endpoint 102, a scanning agent 104, an access gateway 106, a policy database 108, and a server farm 114. In the embodiment shown in FIG. 1A, the server farm 114 includes a protected server 116. Although only one endpoint 102, scanning agent 104, access gateway 106, server farm 114, and protected server 116 are depicted in the embodiment shown in FIG. 1A, it should be understood that the system may provide multiple ones of any or each of those components. For example, in one embodiment, the system 100 includes multiple, logically-grouped protected servers 116, at least some of which are available to execute applications on behalf of an endpoint 102. In these embodiments, the logical group of protected servers may be referred to as a "server farm." In some of these embodiments, the servers may be geographically dispersed.

In brief overview, when the endpoint 102 transmits a request 110 to the access gateway 106 for access to a resource, the scanning agent 104 communicates with endpoint 102, retrieves information about the endpoint 102, and transmits the endpoint information 112 to the access gateway 106. The access gateway 106 makes an access control decision by applying a policy from the policy database 108 to the received information 112.

In more detail, the endpoint 102 transmits a request 110 for a resource to the access gateway 106. In some embodiments, the endpoint 102 transmits the request 110 over a network connection. The network can be a local area network (LAN), a metropolitan area network (MAN), or a wide area network (WAN) such as the Internet. The endpoint 102 and the access gateway 106 may connect to a network through a variety of connections including standard telephone lines, LAN or WAN links (e.g., T1, T3, 56 kb, X.25), broadband connections (ISDN, Frame Relay, ATM), and wireless connections. Connections between the endpoint 102 and the access gateway 106 may use a variety of data-link layer communication protocols (e.g., TCP/IP, IPX, SPX, NetBIOS, NetBEUI, SMB, Ethernet, ARCNET, Fiber Distributed Data Interface (FDDI), RS232, IEEE 802.11, IEEE 802.11a, IEE 802.11b, IEEE 802.11g and direct asynchronous connections).

Upon receiving the request, the access gateway 106 initiates information gathering by the scanning agent 104. The scanning agent 104 gathers information 112 regarding the endpoint 102 and transmits the information 112 to the access gateway 106.

In some embodiments, the scanning agent 104 gathers and transmits the information 112 over a network connection. In some embodiments, the scanning agent 104 comprises bytecode, such as an application written in the bytecode programming language JAVA. In some embodiments, the scanning agent 104 comprises at least one script. In those embodiments, the scanning agent 104 gathers information by running at least one script on the endpoint 102. In some embodiments, the scanning agent 104 comprises an Active X control on the endpoint 102. An Active X control is a specialized COM (Component Object Model) object that implements a set of interfaces that enable it to look and act like a control.

In some embodiments, the scanning agent 104 executes on the endpoint 102. In other embodiments, the scanning agent 104 executes on the access gateway 106. In still other embodiments, the scanning agent 104 executes on a server.

In one embodiment, the access gateway 106 transmits the scanning agent 104 to the endpoint 102. In one embodiment, the access gateway 106 requires a second execution of the scanning agent 104 after the scanning agent 104 has transmitted information 112 to the access gateway 106. In this embodiment, the access gateway 106 may have insufficient information 112 to determine whether the endpoint 102 satisfies a particular condition in a policy. In other embodiments, the access gateway 106 requires a plurality of executions of the scanning agent 104 in response to received information 112.

The scanning agent 104 gathers information 112 including, without limitation, machine ID of the endpoint 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, and authorization credentials.

In some embodiments, the digital watermark includes data embedding. In some embodiments, the watermark comprises a pattern of data inserted into a file to provide source information about the file. In other embodiments, the watermark comprises data-hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address.

In one embodiment, the network connection information comprises a network zone identifying the logon agent to which the endpoint 102 provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 112, the access gateway 106 makes an access control decision based on the received information 112.

Figure 1B:
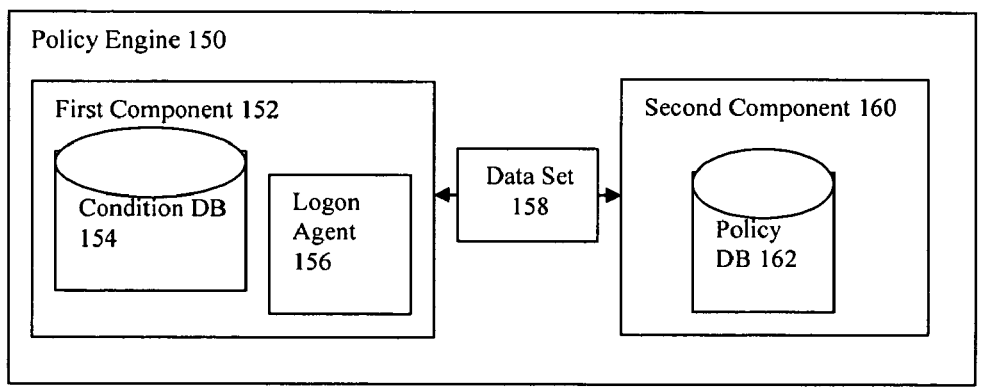
FIG. 1B is a block diagram depicting one embodiment useful in connection with the present invention of a policy engine.

Referring now to FIG. 1B, one embodiment of the invention is depicted in which the network of FIG. 1A further comprises a policy engine 150. The policy engine 150 may include a first component 152 comprising a condition database 154 and a logon agent 156, and including a second component 160 comprising a policy database 162. The first component 152 applies a condition from the condition database 154 to information received about endpoint 102 and determines whether the received information satisfies the condition.

In one embodiment, the policy engine 150 resides on the access gateway 106. In another embodiment, the policy engine 150 resides on a separate computer system than the access gateway 106. In some embodiments, the first component 152 and the second component 160 are logically separate but not physically separate. In some embodiments, the first component 152 and the second component 160 are logically and physically separate. In some embodiments, the condition database 154 resides on the first component 152. In other embodiments, the condition database 154 resides on the second component 160.

In some embodiments, a condition may require that the endpoint 102 execute a particular operating system to satisfy the condition. In some embodiments, a condition may require that the endpoint 102 execute a particular operating system patch to satisfy the condition. In still other embodiments, a condition may require that the endpoint 102 provide a MAC address for each installed network card to satisfy the condition. In some embodiments, a condition may require that the endpoint 102 indicate membership in a particular Active Directory to satisfy the condition. In another embodiment, a condition may require that the endpoint 102 execute a virus scanner to satisfy the condition. In other embodiments, a condition may require that the endpoint 102 execute a personal firewall to satisfy the condition. In some embodiments, a condition may require that the endpoint 102 comprise a particular device type to satisfy the condition. In other embodiments, a condition may require that the endpoint 102 establish a particular type of network connection to satisfy the condition.

If the received information satisfies a condition, the first component 152 stores an identifier for that condition in a data set 158. In one embodiment, the received information satisfies a condition if the information makes the condition true. For example, a condition may require that a particular operating system be installed. If the endpoint 102 has that operating system, the condition is true and satisfied. In another embodiment, the received information satisfies a condition if the information makes the condition false. For example, a condition may address whether spyware exists on the endpoint 102. If the endpoint 102 does not contain spyware, the condition is false and satisfied.

In some embodiments, the logon agent 156 resides outside of the policy engine 150. In other embodiments, the logon agent 156 resides on the policy engine 150. In one embodiment, the first component 152 includes a logon agent 156, which initiates the information gathering about endpoint 102. In some embodiments, the logon agent 156 further comprises a data store. In these embodiments, the data store includes the conditions for which the scanning agent may gather information. This data store is distinct from the condition DB 154.

In some embodiments, the logon agent 156 initiates information gathering by executing the scanning agent 104. In other embodiments, the logon agent 156 initiates information gathering by transmitting the scanning agent 104 to the endpoint 102 for execution on the endpoint 102. In still other embodiments, the logon agent 156 initiates additional information gathering after receiving information 112. In one embodiment, the logon agent 156 also receives the information 112. In this embodiment, the logon agent 156 generates the data set 158 based upon the received information 112. In some embodiments, the logon agent 156 generates the data set 158 by applying a condition from the database 154 to the information received from the scanning agent 104.

In some embodiments, an endpoint 102 has authenticated itself to a VPN Access Gateway and securely transmits a request for a direct connection to a resource on a protected network. In one of these embodiments, although the endpoint 102 has authenticated itself, no determination has been made as to what resources the endpoint 102 is authorized to access. In some of these embodiments therefore, the logon agent 156 intercepts any packet transmitted to a resource on the network. In one of these embodiments, the logon agent 156 analyzes the intercepted packet and identifies a request for a resource. In another of these embodiments, the logon agent 156 applies a policy to the request contained within the packet to determine whether to allow or deny the request. In still another of these embodiments, the logon agent 156 transmits a scanning agent 104 to the endpoint 102 to acquire information 112 that the logon agent 156 may use in applying the policy to the request. In these embodiments, intercepting and analyzing connections to a resource on a network and requests for the resource enables increased policy-based control over access to network resources.

In another embodiment, the first component 152 includes a plurality of logon agents 156. In this embodiment, at least one of the plurality of logon agents 156 resides on each network domain from which an endpoint 102 may transmit a resource request. In this embodiment, the endpoint 102 transmits the resource request to a particular logon agent 156. In some embodiments, the logon agent 156 transmits to the policy engine 150 the network domain from which the endpoint 102 accessed the logon agent 156. In one embodiment, the network domain from which the endpoint 102 accesses a logon agent 156 is referred to as the network zone of the endpoint 102.

The condition database 154 stores the conditions which the first component 152 applies to received information. The policy database 162 stores the policies which the second component 160 applies to the received data set. In some embodiments, the condition database 154 and the policy database 162 store data in an ODBC-compliant database. For example, the condition database 154 and the policy database 162 may be provided as an ORACLE database, manufactured by Oracle Corporation of Redwood Shores, Calif. In other embodiments, the condition database 154 and the policy database 162 can be a Microsoft ACCESS database or a Microsoft SQL server database, manufactured by Microsoft Corporation of Redmond, Wash.

After the first component 152 applies the received information to each condition in the condition database 154, the first component transmits the data set 158 to second component 160. In one embodiment, the first component 152 transmits only the data set 158 to the second component 160. Therefore, in this embodiment, the second component 160 does not receive information 112, only identifiers for satisfied conditions. The second component 160 receives the data set 158 and makes an access control decision by applying a policy from the policy database 162 based upon the conditions identified within data set 158.

In one embodiment, the policy database 162 stores the policies applied to the received information 112. In one embodiment, the policies stored in the policy database 162 are specified at least in part by the system administrator. In another embodiment, a user specifies at least some of the policies stored in the policy database 162. The user-specified policy or policies are stored as preferences. The policy database 162 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the endpoint 102. One of the policies stored in the policy database 162 might require or forbid automatic connection to disconnected application sessions. Yet another policy might make connection contingent on the endpoint 102 that requests access being within a secure network. Another policy might require or forbid automatic connection to active application sessions currently connected to a different endpoint 102. A further policy might only allow connection to application sessions after receiving user approval. Another policy might only allow connection for a predetermined time after disconnection. Still another policy only allows connection to application sessions that include specific applications. One policy might allow viewing only of the transformed contents of a requested file. A policy might allow the viewing of only an HTML version of the requested file. In some embodiments, access to a resource is provided while download of the file to the endpoint 102 is prevented. This may be accomplished in a number of ways, including: transformation of the file contents into a viewer-only format, transforming the file contents into HTML for viewing by a web browser, use of file type association to open the file using an application hosted by a server in a server farm instead of using an application hosted by the endpoint 102, or by using a system of the sort described in U.S. application Ser. No. 10/931,405, the contents of which are incorporated herein by reference.

In some of the embodiments above, the method and apparatus provide document protection for proprietary information. In these embodiments, the endpoint 102 cannot access the networked resources unless the policy engine 150 grants the endpoint 102 permission to access the resources. In one of these embodiments, the policy engine 150 is the single exposed network element, to ensure that the endpoint 102 must access the policy engine 150 in order to access the networked resources. In another of these embodiments, the URLs used to access the networked resources behind the policy engine 150 are rewritten to prevent direct access by the endpoint 102. In others of the embodiments above, the method and apparatus enhance the capabilities of the endpoint 102 to access resource otherwise inaccessible. In some of the embodiments above, the method and apparatus provide both protection of proprietary information and enhanced endpoint 102 capabilities.

In some embodiments, the endpoint 102 is a personal digital assistant. In other embodiments, the endpoint 102 is a cellular telephone. In other embodiments, the endpoint 102 is a laptop computer. In other embodiments, the endpoint 102 is a desktop computer. In other embodiments, the endpoint 102 is an Internet kiosk.

For embodiments in which the endpoint 102 is a mobile device, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. A typical mobile device may comprise many of the elements described in FIGS. 2A and 2B, including the processor 202 and the main memory 204.

In other embodiments in which the endpoint 102 is a mobile device, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the endpoint 102 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the endpoint 102 is a combination PDA/telephone device such as the Treo 180, Treo 270, Treo 600, or the Treo 650, all of which are manufactured by palmOne, Inc. of Milpitas, Calif. In still further embodiments, the endpoint 102 is a cellular telephone that operates under control of the PocketPC operating system, such as the MPx200, manufactured by Motorola Corp. A typical combination PDA/telephone device may comprise many of the elements described below in FIGS. 2A and 2B, including the processor 202 and the main memory 204.

In some embodiments, the access gateway 106 comprises a standalone computer server. In other embodiments, the access gateway 106 comprises a rack mount computer. In still other embodiments, the access gateway 106 comprises a blade server. In some embodiments, the protected server 116 comprises a standalone computer server. In other embodiments, the protected server 116 comprises a rack mount computer. In still other embodiments, the protected server 116 comprises a blade server.

Figure 2A:
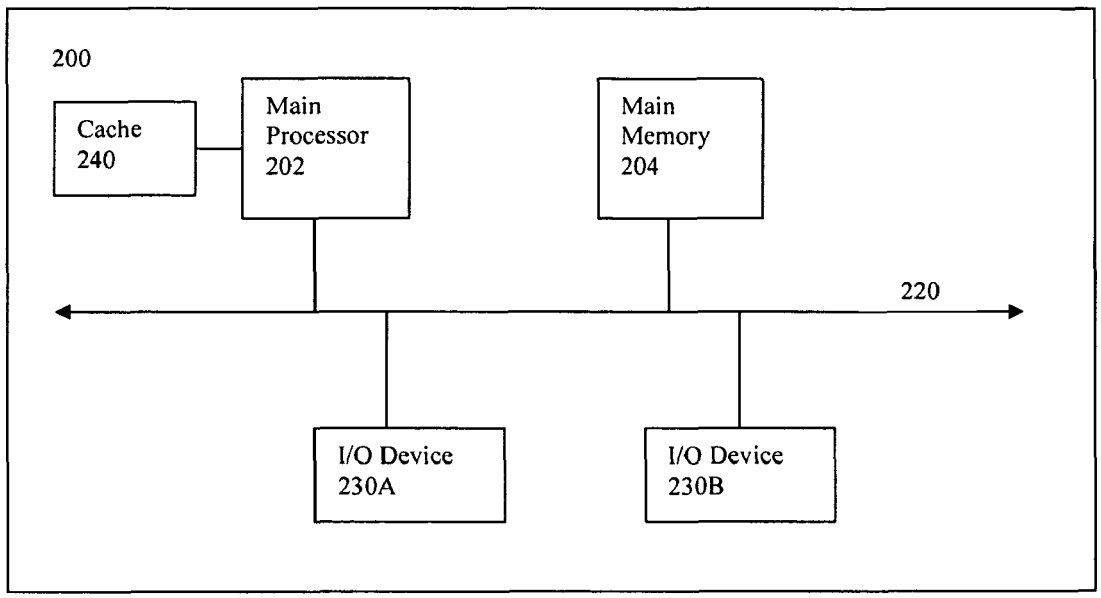
FIGS. 2A and 2B are block diagrams depicting embodiments of a computer useful in connection with the present invention.
Figure 2B:
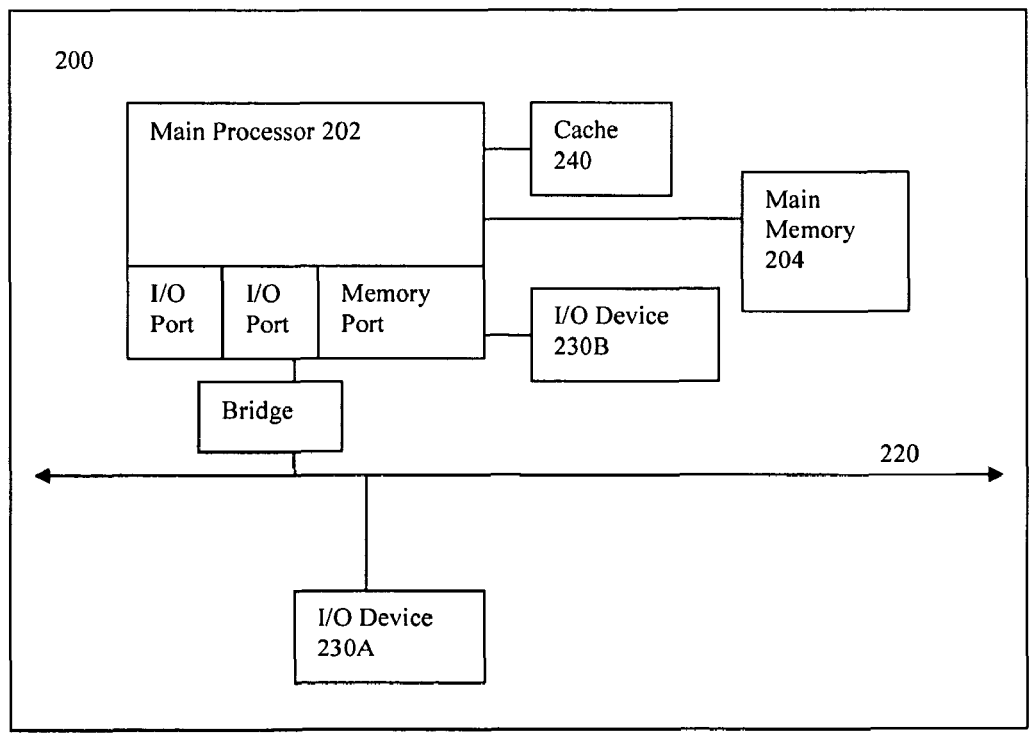

FIGS. 2A and 2B depict block diagrams of embodiments in which the endpoint 102, the access gateway 106, or the protected server 116 comprise a typical computer 200. The computer 200 may be provided as a personal computer or computer server, of the sort manufactured by the Hewlett-Packard Corporation of Palo Alto, Calif., or the Dell Corporation of Round Rock, Tex. As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Pentium III, Pentium IV, Pentium M, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athlon 64 FX, the AMD Athlon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B, the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 2B depicts an embodiment of a computer 200 in which the main processor 202 communicates directly with I/O device 230*b* via HyperTransport, Rapid I/O, or InfiniBand. FIG. 2B also depicts an embodiment in which local busses and direct communication are mixed: the processor 202 communicates with I/O device 230*a* using a local interconnect bus while communicating with I/O device 230*b* directly.

A wide variety of I/O devices 230 may be present in the computer 200. Input devices include keyboards, mice, trackpads, trackballs, microphones, and drawing tablets. Output devices include video displays, speakers, inkjet printers, laser printers, and dye-sublimation printers.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

General-purpose desktop computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

A computer 200 may also be any personal computer (e.g., 286-based, 386-based, 486-based, Pentium-based, Pentium II-based, Pentium III-based, Pentium 4-based, Pentium M-based, or Macintosh computer), Windows-based terminal, Network Computer, wireless device, information appliance, RISC Power PC, X-device, workstation, mini computer, main frame computer, personal digital assistant, or other computing device. Windows-oriented platforms supported by the computer 200 can include, without limitation, WINDOWS 3.x, WINDOWS 95, WINDOWS 98, WINDOWS NT 3.51, WINDOWS NT 4.0, WINDOWS 2000, WINDOWS CE, WINDOWS ME, WINDOWS XP, WINDOWS Longhorn, MAC/OS, Java, and UNIX. The computer 100 can include a visual display device (e.g., a computer monitor), a data entry device (e.g., a keyboard), persistent or volatile storage (e.g., computer memory) for storing downloaded application programs, a processor, and a mouse. Execution of a communication program allows the system 200 to participate in a distributed computer system model.

Figure 3:
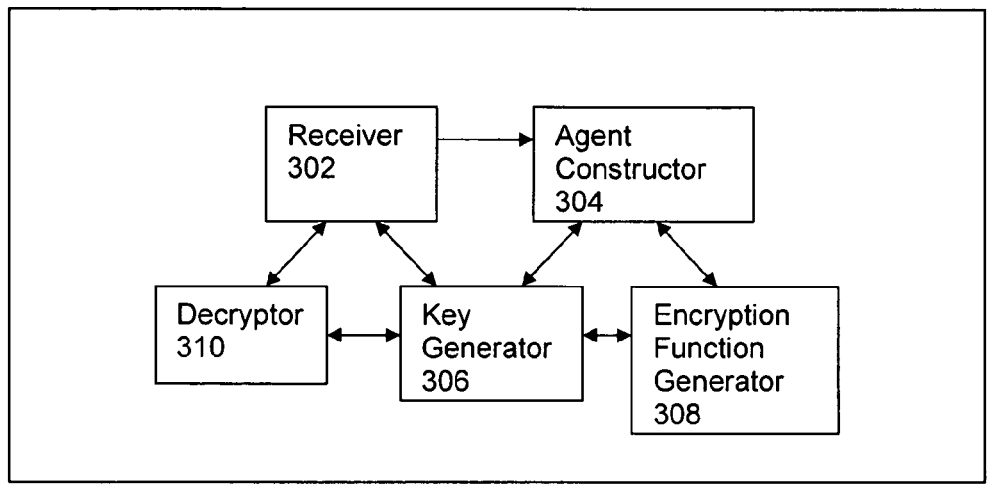
FIG. 3 is a block diagram depicting one embodiment of an access gateway.

Referring now to FIG. 3, one embodiment of an access gateway 106 includes a receiver 302, an agent constructor 304, a key generator 306, a encryption function generator 308, and a decryptor 310. In brief overview, the receiver 302 receives a request to access a resource. The agent constructor 304 communicates with the receiver 302 and generates a scanning agent 104 for gathering information about the requestor. The key generator 306 communicates with the receiver 302 and with the agent constructor 304 and generates at least one key. The encryption function generator 308 communicates with the agent constructor 304 and key generator 306, and embeds the at least one generated key in the generated scanning agent 104. The decryptor 310 communicates with the receiver 302 and the key generator 306, receives encrypted gathered information about the requestor and decrypts the gathered information. Although in the embodiment depicted in FIG. 3 all of the components of the access gateway are depicted as a single unit, they may be distributed over multiple physical entities.

Referring now to FIG. 3, and in greater detail, the receiver 302 receives a request to access a resource. In some embodiments, the receiver 302 receives the request from an endpoint 102. In one embodiment, the requested resource is located on the same network as the receiver 302. In another embodiment, the requested resource is hosted by a protected server 116 residing on the same network as the receiver 302.

In some embodiments, prior to making a decision regarding the request, the receiver 302 transmits a scanning agent 104 to the requestor to gather information about the requestor. In one of these embodiments, the receiver 302 receives encrypted gathered information from the generated scanning agent 104 and transmits the received encrypted gathered information to the decryptor 310. In another of these embodiments, the receiver 302 may make a decision regarding the request responsive to the decrypted gathered information. In one embodiment, the receiver 302 comprises a policy engine applying a policy to the received gathered information to make a decision regarding the request.

The agent constructor 304 generates a scanning agent 104 for gathering information about the requestor. In one embodiment, the agent constructor 304 resides on the same system as the receiver 302. In some embodiments, the agent constructor 304 generates a scanning agent 104 responsive to a request received by the receiver 302.

In one embodiment, the agent constructor 304 comprises a transmitter for transmitting the generated scanning agent 104 to the requestor. In other embodiments, the agent constructor 304 returns the scanning agent 104 to the receiver 302, which transmits the scanning agent 104 to the requestor.

In one embodiment, the agent constructor 304 selects a subset of a plurality of scan routines for execution on the requestor. In some embodiments, the agent constructor 304 generates a unique scanning agent for each request to access resources. In other embodiments, the agent constructor 304 generates the scanning agent 104 at runtime.

The key generator 306 communicates with the receiver 302 and the agent constructor 304 and generates at least one key in response to a request by the agent constructor 304. In one embodiment, the key generator 306 generates a unique key upon receiving a request for a key. In another embodiment, the key generator 306 generates a key in advance of a request. In one embodiment, the key generator 306 is special-purpose hardware, such as an application specific integrated circuit (ASIC) or a field-programmable gate array. In another embodiment, the key generator 306 is software executing on a general-purpose computer.

In some embodiments, the key generated by the key generator 306 is 56, 64, 128, 256, or 1024 bits in length. In other embodiments, the key generator 306 generates a key for use in encryption algorithms including, but not limited to, the Diffie-Hellman, RC2, RC5, RC6, Rijndael, DFC, Twofish, HPC, Crypton, E2, Mars, Cast-256, Safer+, Serpent, Deal, AES, DES, or TripleDES algorithms.

In one embodiment, the encryption function generator 308 creates executable program code, the executable program code providing functionality for encrypting data with a generated key embedded in the program code of the scanning agent 104. The encryption function generator 308 may generate instructions within the code which explicitly perform each step of an encryption algorithm. Each execution of the encryption function generator 308 may result in generation of a different set of instructions for encrypting data because the instructions for explicitly performing each step of an encryption algorithm may be expressed differently in each execution of the encryption function generator 308. Executing the program code provided by the encryption function generator 308 may result in encrypted data that is substantially similar to the output of encrypting data with a standard encryption algorithm.

Typically an encryption key would be stored in a data section in program code, the data section storing data used by executable instructions stored in a text section of the program code. In some embodiments of the present invention, however, generated encryption keys are stored in the text section, preventing malicious attackers from easily identifying the generated encryption keys. In one of these embodiments, the encryption function generator 308 also embeds instructions for encrypting data with the generated key in the text section of the scanning agent 104. For example, if the generated key is a 128 bit key, the encryption function generator 308 may generate executable instructions to perform an encryption operation with four sets of 32 bits on gathered information. Executing these instructions may result in substantially the same output of encrypted information as performing a single operation with the 128 bit key on the gathered information. However, the encryption algorithm and the generated key may not be easily identifiable by a malicious attacker when coded in this manner.

In one embodiment, multiple keys are embedded into the scanning agent 104 and used to encrypt the gathered information. In this embodiment, the encryption function generator 308 generates a block of executable program code for each key to be embedded into the scanning agent 104. In one embodiment, as each block of executable program code embedded in the scanning agent 104 is executed, the information the scanning agent 104 gathers is encrypted with the embedded key.

In an embodiment where the scanning agent 104 comprises bytecode the agent constructor 304 may obfuscate the program code of the scanning agent 104. In some embodiments, the agent constructor 304 uses a software program to obfuscate the program code. In other embodiments, the agent constructor 304 receives input from a user or administrator to obfuscate the program code. In some embodiments, the agent constructor 304 creates a scanning agent 104 comprising program code that contains instructions for how to encrypt information using a key embedded in the program code. In one embodiment, the agent constructor 304 generates a new, unique scanning agent 104 each time the receiver 302 receives a request to access a resource.

In embodiments where the agent constructor 304 obfuscates the program code of the scanning agent 104, obfuscation may result in a high degree of confidence that a static analyzer cannot guess how to decrypt an block of program code. There are obfuscating compilers available that at an instruction level produce an unpredictable block of program code that accomplishes the same result as the instruction being obfuscated. For example, there are an infinite number of ways to create the machine instructions for the C statement I=I+1. This embodiment, coupled with heuristics on the access gateway 106 that require the results of an endpoint analysis to be delivered within a certain amount of time, may ensure that the program is not subject to a human debugger and analysis and that the results can be trusted.

In one embodiment, the decryptor 310 decrypts gathered information sent from the scanning agent 104 in an encrypted form to the access gateway 106. In some embodiments, the decryptor 310 receives the encrypted information from the receiver 302. In one embodiment, the decryptor 310 uses a shared secret key generated by the key generator 306 to decrypt the information. In another embodiment, the decryptor 310 uses a private key generated by the key generator 306 to decrypt the information.

Figure 4:
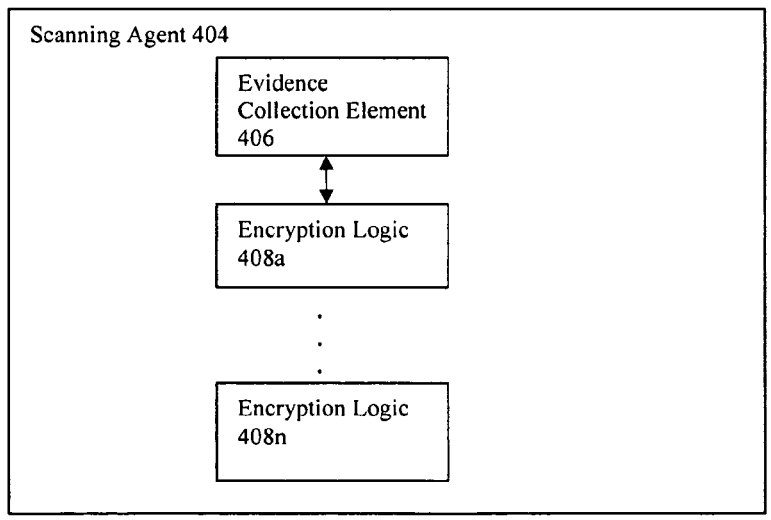
FIG. 4 is a block diagram depicting one embodiment of a scanning agent.

Referring now to FIG. 4, a block diagram depicts one embodiment of a scanning agent 404, including an evidence collection element 406 and at least one encryption logic element 408. In brief overview, the evidence collection element 406 executes to gather information about an endpoint 102. The encryption logic element 408 includes functionality for encrypting the gathered information. In one embodiment, the scanning agent is dynamically generated at runtime by an agent constructor 304 in communication with a key generator 306 and an encryption function generator 308.

In one embodiment, the evidence collection element 406 may include scan routines executed upon arrival at the endpoint 102 to gather information about the endpoint 102. The information gathered may include information 112 as described above with regard to FIG. 1A. The evidence collection element 406 may transmit the gathered information to the encryption logic element 408 for encryption prior to transmission back to the receiver 302.

The encryption logic element 408 may be program code generated by an execution of the encryption function generator 308. In one embodiment, the scanning agent 404 includes a plurality of encryption logic elements, depicted in FIG. 4 as encryption logic elements 408a through 408n. In some embodiments, the encryption logic elements 408 may be referred to as encryption jackets.

In one embodiment, the evidence collection element 406 and the encryption logic elements 408 may be implemented as blocks of executable program code. In an embodiment with multiple encryption logic elements 408, each encryption logic element 408 includes code for encrypting, with a unique key, the information gathered by the evidence collection element 406. In this embodiment, the gathered information may be encrypted multiple times with multiple keys.

In one embodiment, the number of encryption logic elements 408 embedded in the scanning agent 404 by the encryption function generator 308 varies for each scanning agent 404 generated. In this embodiment, the variable number of encryption logic elements 408 embedded in the scanning agent 404 and encrypting the gathered information with a unique key may prevent a malicious attacker from locating and retrieving a key stored in a known location. In one embodiment, the number of encryption logic elements 408 embedded when generating the scanning agent 404 is dynamically generated by the access gateway 404 and is not stored anywhere.

Figure 5:
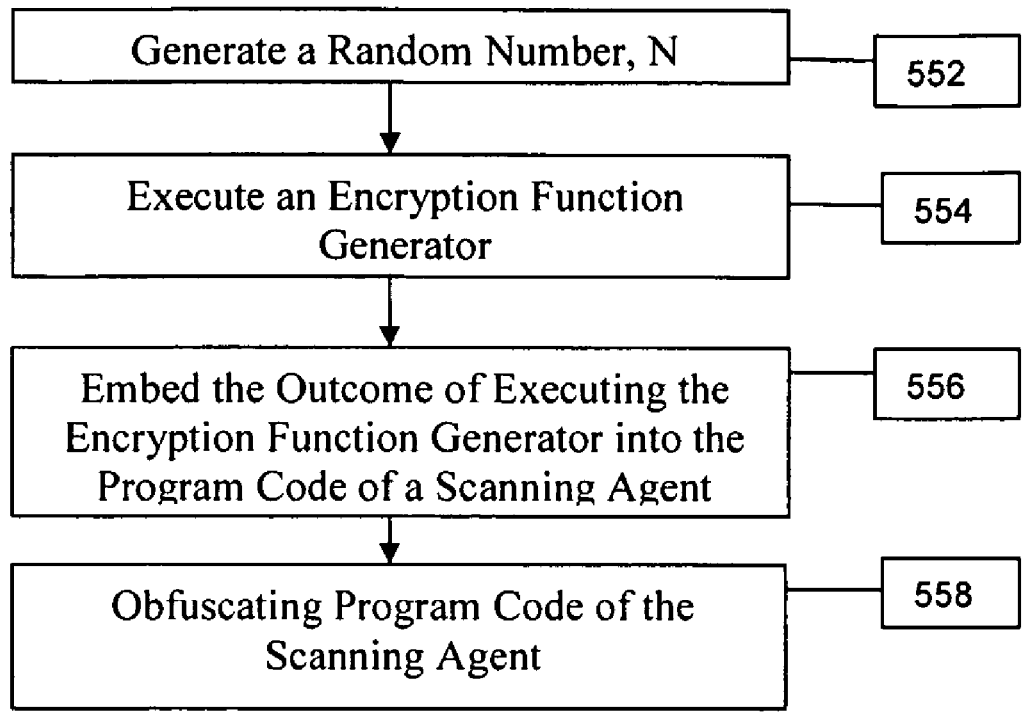
FIG. 5 is a flow diagram summarizing one embodiment of the steps taken to generate a scanning agent.

Referring now to FIG. 5, a flow diagram summarizes one embodiment of the steps taken to generate a scanning agent 104. In brief overview, a random number N is generated (step 552). An encryption function generator is executed (step 554). The outcome of executing the encryption function generator is embedded into the program code of a scanning agent (step 556). The program code of the scanning agent is obfuscated (step 558).

A random number is generated (step 552). In one embodiment, the agent constructor 304 generates this number. In another embodiment, the encryption function generator 308 generates this number. In some embodiments, the random number represents the number of encryption logic elements 408 to be generated by the encryption function generator.

The encryption function generator 308 is executed (step 554). In one embodiment, each execution of the encryption function generator 308 results in the generation of a separate encryption logic elements 408, each encryption logic element 408 enabling the encryption of gathered information with a unique key. In some embodiments, the encryption function generator 308 generates a set of executable instructions which encrypt gathered information in a substantially similar manner as a standard encryption algorithm.

The outcome of executing the encryption function generator is embedded into the program code of a scanning agent 104 (step 556). In one embodiment, the agent constructor 304 embeds the outcome in the scanning agent 104. In another embodiment, the encryption function generator 308 embeds the outcome in the scanning agent 104.

The program code of the scanning agent is obfuscated (step 558). Obfuscation of program code may make it extremely difficult for static analysis based programs to determine the type of the contained block (decryption block versus evidence collection block).

In some embodiments, techniques may be used to guard against debuggers and trace programs. In one embodiment, the program code of the scanning agent 104 is scanned for breakpoint type of instructions, such as int3 instructions, which cannot be randomly inserted into the scanning agent. Additionally, in other embodiments, the executing scanning agent may be scanned for these instructions. In these embodiments, execution of the scanning agent may be aborted upon identification of such an instruction.

Another embodiment enables the prevention of an attack by debugger or trace program. Since a process cannot be doubly traced, it is possible that each execution block asks the operating system to trace it. Tracing the execution block by the operating system may prevent a malicious attacker from tracing the execution block. For example, in Linux, the following block of code can detect an attempt to trace an execution block: if (ptrace(PTRACE_TRACEME, 0, 1, 0)<0) {/*being traced*/}

In some embodiments, a workaround for preventing an attack on a scanning agent 104 includes the use of an alternative wrapper scheme that does not use a standard decryption algorithm. In one of these embodiments, variable key lengths are used with arbitrary data to confuse an adversary as to segment size.

In conjunction with timing-based analysis, in which the access gateway 106 determines the time taken to perform the scanning of the endpoint 102 and rejects result that exceed a predetermined threshold, the embodiments described could prevent malicious attackers from spoofing the results of a host check and falsely reporting themselves as a compliant endpoint.

Figure 6:
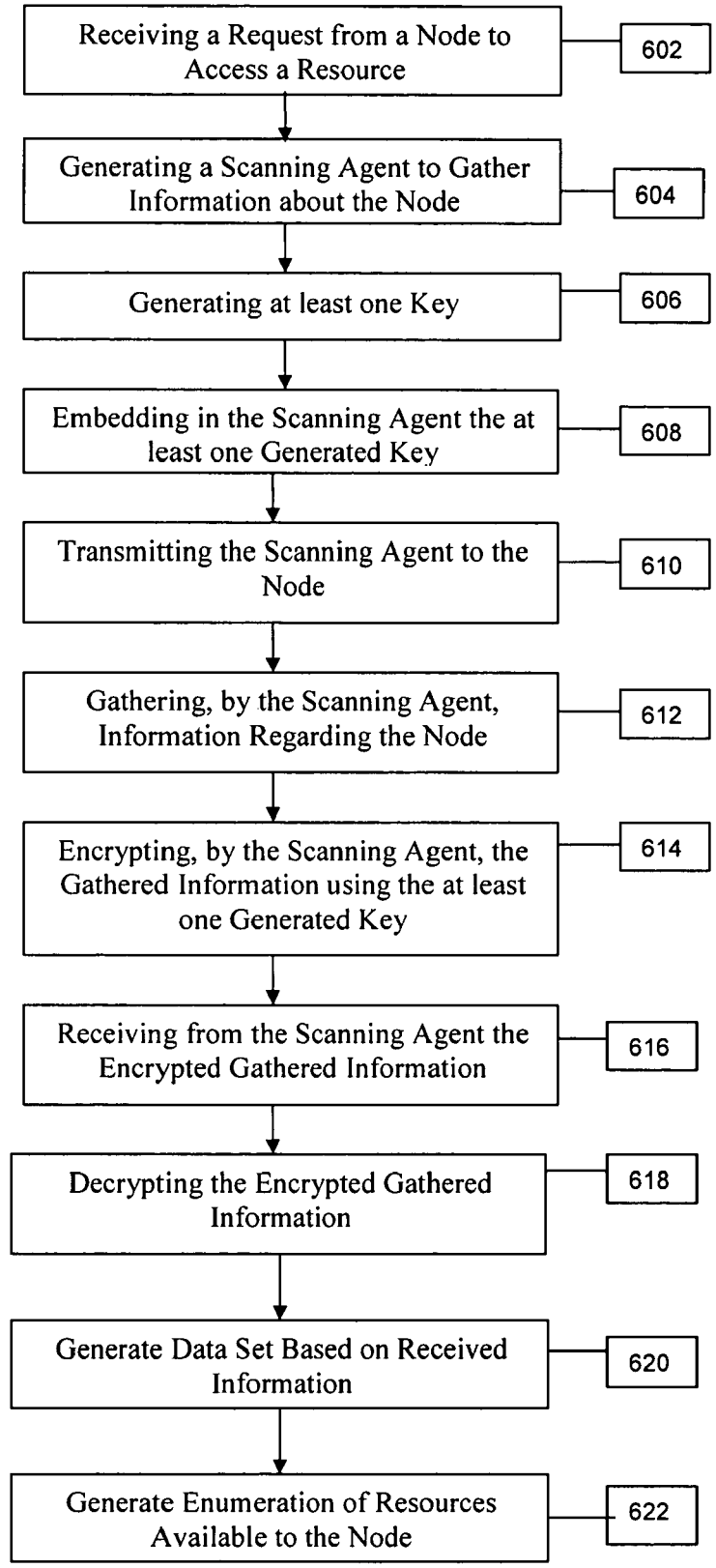
FIG. 6 is a flow diagram depicting one embodiment of the steps taken in a method to grant access to resources.

Referring now to FIG. 6, a flow diagram depicts one embodiment of the steps taken to grant access to resources. In brief overview, a request is received from a node to access a resource (step 602). A scanning agent 104 is generated to gather information about the node (step 604). At least one key is generated (step 606). The at least one key is embedded in the scanning agent 104 (step 608). The scanning agent 104 is transmitted to the node (step 610). The scanning agent 104 gathers information regarding the node (step 612). The scanning agent 104 encrypts the gathered information using the at least one generated key (step 614). The encrypted gathered information is received from the scanning agent 104 (step 616). The encrypted gathered information is decrypted (step 618). A data set is generated based on the received information (step 620). An enumeration of resources available to the node is generated (step 622).

Still referring to FIG. 6, and in greater detail, a request is received from a node to access a resource (step 602). In one embodiment, the request is received via a network connection by an access gateway 106. In some embodiments, the node is an endpoint 102 seeking access to a resource on a network.

A scanning agent 104 is generated to gather information about the node (step 604). In one embodiment, the scanning agent 104 comprises a subset of scan routines to be executed on the node, selected from a plurality of available scan routines. The subset of scan routines may be selected to collect information 112. In some embodiments, a unique scanning agent 104 is generated for each node that requests access to a resource.

At least one key is generated (step 606). In one embodiment, at least one shared secret key is generated. In another embodiment, at least one public key and one private key are generated. In some embodiments, multiple keys are generated.

The at least one key is embedded in the scanning agent 104 (step 608). In one embodiment, the at least one generated key is used by the scanning agent 104 to encrypt gathered information 112. In some embodiments, the program code of the scanning agent 104 is obfuscated. In one of these embodiments, a software program is used to obfuscate the program code.

In some embodiments, the scanning agent 104 comprises hard coded instructions for encrypting gathered information regarding the node with the reconstructed key. In one embodiment, the scanning agent 104 encrypts the gathered information with a public key. In another embodiment, the scanning agent 104 encrypts the gathered information with a shared secret key.

The scanning agent 104 is transmitted to the node (step 610). In some embodiments, the receiver 602 transmits the scanning agent 104 to the node. In one of these embodiments, the receiver 602 may download the scanning agent 104 to the node.

The scanning agent 104 gathers information 112 regarding the node (step 612). In some embodiments, the scanning agent 104 gathers the information about the node across a network connection. In one of these embodiments, the scanning agent 104 may remotely download scan routines to the node. In another of these embodiments, the scanning agent 104 may remotely execute scan routines on the node. In other embodiments, the scanning agent 104 executes at least one script on the node to gather information.

The scanning agent 104 encrypts the gathered information using the at least one generated key (step 614). In some embodiments, the scanning agent 104 encrypts the gathered information using a plurality of generated keys. In one embodiment, the scanning agent 104 encrypts the gathered information using a shared secret key. In another embodiment, the scanning agent 104 encrypts the gathered information using a generated public key. The encrypted gathered information is received from the scanning agent 104 (step 616). In one embodiment, the encrypted gathered information is received by the receiver 602.

The encrypted gathered information is decrypted (step 618). In some embodiments, the encrypted gathered information is decrypted with the at least one generated key. In other embodiments, the gathered information is encrypted with a public key and the gathered information is decrypted with a private key. In still other embodiments, multiple keys are required to decrypt the encrypted gathered information.

The access gateway 106 generates a data set 158 based upon the information (step 620). In some embodiments, the access gateway 106 requests further information about the node from the scanning agent 104. In these embodiments, the access gateway 106 requires more than one execution of the scanning agent 104 on the node. In those embodiments, the access gateway 106 generates a data set 158 after receiving the additional requested information. In these embodiments, the access gateway 106 may have insufficient information 112 to determine whether the node satisfies a particular condition. In others of these embodiments, the conditions may be indeterminate. In some of the embodiments where the conditions are indeterminate, the scanning agent 104 could not gather the information required to satisfy the condition.

The data set 158 contains identifiers for each condition satisfied by the received information 112. Then the access gateway 106 applies a policy to each identified condition within the data set 158. That application yields an enumeration of resources which the node may access (step 622). In one embodiment, the resources comprise proprietary data. In some embodiments, the resources comprise web pages. In other embodiments, the resources comprise word processing documents. In still other embodiments, the resources comprise spreadsheets. In some embodiments, the enumeration includes only a subset of the resources that the node may access. The access gateway 106 then presents that enumeration to the node. In some embodiments, the access gateway 106 creates a Hypertext Markup Language (HTML) document used to present the enumeration to the node.

Figure 7A:
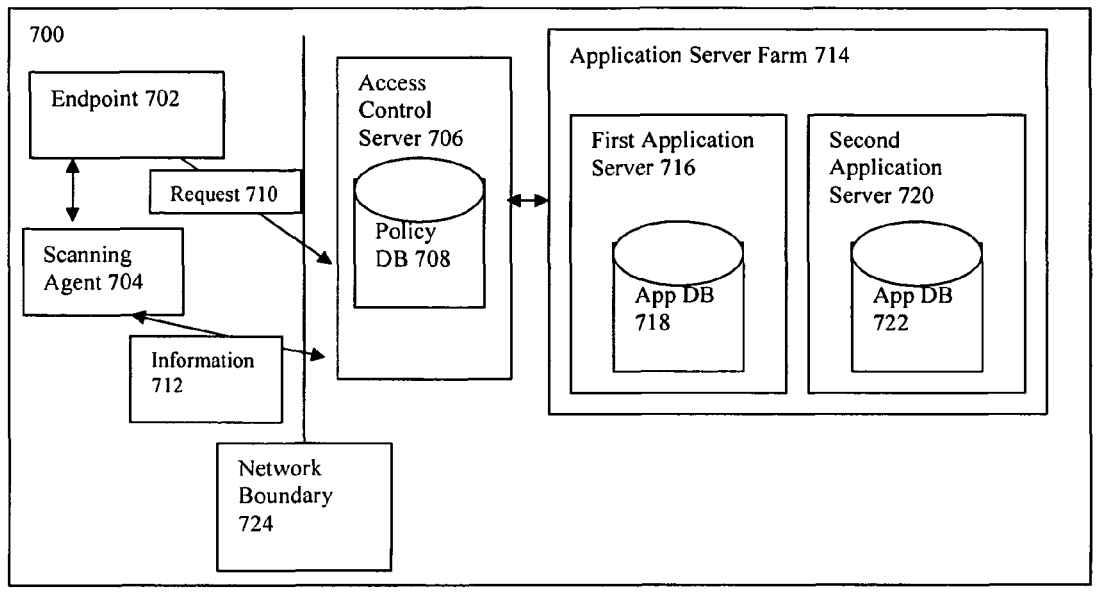
FIG. 7A is a block diagram of an embodiment of a computer network in which the network provides policy-based access to file contents for an endpoint.

Referring now to FIG. 7A, one embodiment of a computer network 700 constructed in accordance with the invention is depicted, which includes a endpoint 702, a scanning agent 704, an access control server 706, a policy database 708, an application server farm 714, a first application server 716, an application database 718, a second application server 720, and a second application database 722. In some embodiments, there is a network boundary 724 separating the network on which the endpoint 702 resides from the network on which the access control server 706 and application server farm 714 reside.

In brief overview, when the endpoint 702 transmits to the access control server 706 a request 710 for access to a resource, the scanning agent 704 communicates with endpoint 702, retrieving information 712 about the endpoint 702, and transmitting endpoint information 712 to access control server 706. In one embodiment, the endpoint 702 transmits the request 710 after policy engine 156 presents the endpoint 702 with an enumeration of available resources. The access control server 706 makes an access control decision by applying a policy from the policy database 708 to the received information 712. Finally, the access control server 706 transmits a file type to the application server farm 714 for presentation of the file contents to the endpoint 702. Additional components of the computer network 700 are omitted and will be described further in FIG. 7B.

Figure 7B:
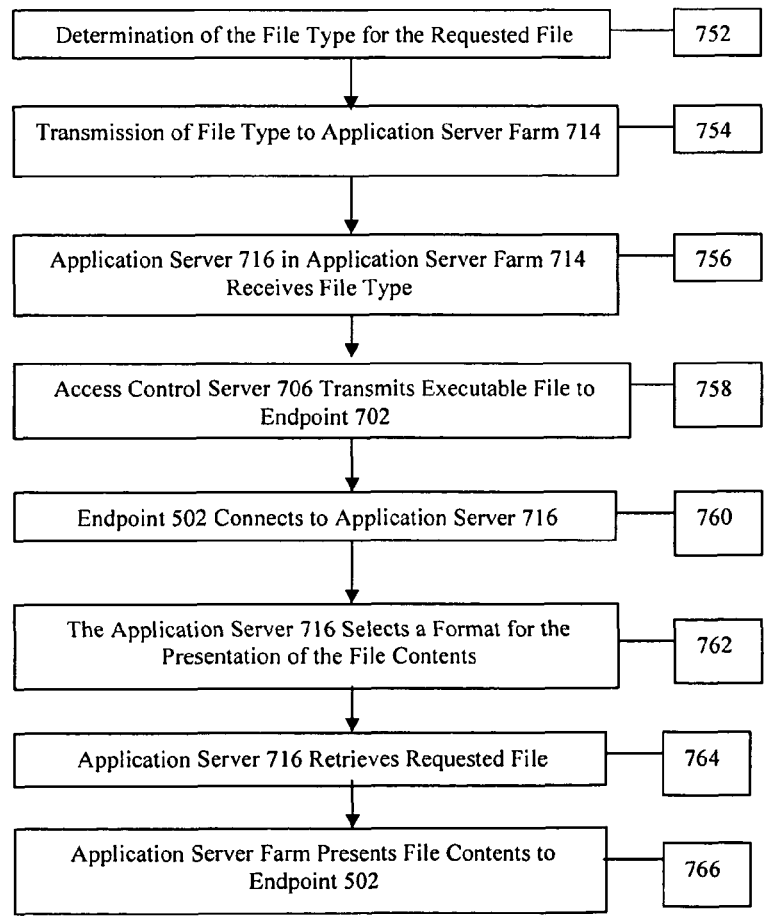
FIG. 7B is a flow diagram depicting one embodiment of the steps taken by an application server farm to provide file contents to an endpoint.

Referring now to FIG. 7B, a flow diagram depicts one embodiment of the steps taken by the access control server 706 and the application server farm 714 to provide file contents to the endpoint 702. Part of the application server farm 714 is an application server 716.

In one embodiment, once the access control server 706 decides to grant the endpoint 702 access to the requested file, the access control server 706 determines the file type forhe requested file (step 752). In other embodiments, the application server 716 determines the file type for the requested file. In still other embodiments, a server other than the application server 716 or the access control server 706 determines the file type. In some embodiments, the server determining the file type must first retrieve the requested file. In some of those embodiments, the file is located on the same side of the network boundary 724 as the server determining the file type. In others of those embodiments, the file is located on the same side of the network boundary 724 as the endpoint 702. In these embodiments, the method and apparatus enhance the capabilities of the endpoint 702 to access resources otherwise inaccessible, but they do not provide document protection for proprietary information.

In some embodiments, the network boundary 724 physically separates at least two networks. In other embodiments, the network boundary 724 logically separates at least two networks. In one embodiment, the network boundary 724 is a firewall.

In one embodiment, the file extension is the file type and the server determining the file type does so by extracting the file extension from the file. In another embodiment, a resource fork is the file type. After determining file type, the server determining the file type transmits the file type to the application server farm 714 for retrieval and presentation to the endpoint 702 (step 754).

The application server 716 receives the file type from the access control server 706. (step 756). In some embodiments, the application server 716 identifies an application program associated with that file type. In other embodiments, the access control server 706 identifies an application program associated with that file type. In still other embodiments, a server other than the access control server 706 or the application server 716 identifies the application program associated with that file type.

In one embodiment, the server identifying the application program associated with the file type queries an application database 718 to retrieve an identifier for the application program. In some embodiments, the application database 718 is a registry file. In embodiments where either the application server 716 or a separate server identify the application type based on the file type, the identifying server then transmits to the access control server 706 the identifier to the application program. In some embodiments, the identifying server transmits the identifier to the access control server 706 over a network connection.

In some embodiments, neither the access control server 706 nor a separate server need to transmit the file type to the application server 716 to determine the identifier of the associated application program. In one of these embodiments, the application server 716 transmits to the access control server 706 a list of hosted application programs and the file types with which those application programs are associated. In these embodiments, the access control server 706 retrieves from the transmitted list the identifier for the application program associated with the file type.

When the access control server 706 receives the identifier of the application program, the access control server 706 creates and transmits to the endpoint 702 an executable file (step 758). In some embodiments, the executable file contains the identifier of the application program. In some embodiments, the executable file contains the identifier of an application server in the application server farm 714 that will present the contents of the file to the endpoint 702. In some embodiments, the same application server 716 that identified the application program to use with the file type will present the contents of the file to the endpoint 702. In other embodiments, a second application server 720 presents the contents of the file to the endpoint 702. In one embodiment, the executable file contains both the identifier of the application program and the identifier of an application server in the application server farm 714 what will present the contents of the file to the endpoint 702. In some embodiments, the executable file enables the endpoint 702 to connect with an identified server using a presentation-layer protocol such as the Independent Computing Architecture (ICA) protocol, available from Citrix Systems, Inc. of Fort Lauderdale, Fla. In other embodiments, the executable file enables the endpoint 702 to connect with an identified server using the Remote Desktop Protocol (RDP), manufactured by Microsoft Corporation. In other embodiments, the presentation-layer protocol is wrapped in a higher protocol.

The endpoint 702 receives the executable file from the access control server 706. The endpoint 702 connects to the application server 716 identified in the executable file (step 760). In one embodiment, the endpoint 702 connects to the identified application server 716 using the ICA protocol. In another embodiment, the endpoint 702 connects to the identified application server 716 using RDP.

The application server 716 selects a format for the presentation of the file contents (step 762). In other embodiments, the access control server 706 identifies the format used to present the file contents. In those embodiments, the access control server 706 may apply a policy to identify the available formats. In some embodiments, the application server 716 selects the format based upon received information about the endpoint 702. In other embodiments, the application server 716 selects the format by applying a policy to the received information.

The application server 716 accepts the endpoint 702 connection and retrieves the requested file (step 764). In one embodiment, the application server 716 retrieves the file from a web server. In another embodiment, the application server 716 retrieves the file from a file server. In yet another embodiment, the retrieved file is an email attachment. In this embodiment, the application server 716 retrieves the file from an electronic mail server. In some embodiments, the mail server is a Lotus mail server. In other embodiments, the mail server is an Outlook mail server or an Outlook Web Access mail server.

The application server 716 then presents the contents of the file to the endpoint 702 over the connection (Step 766). In one embodiment, the file contents presented comprise an email attachment.

Figure 8:
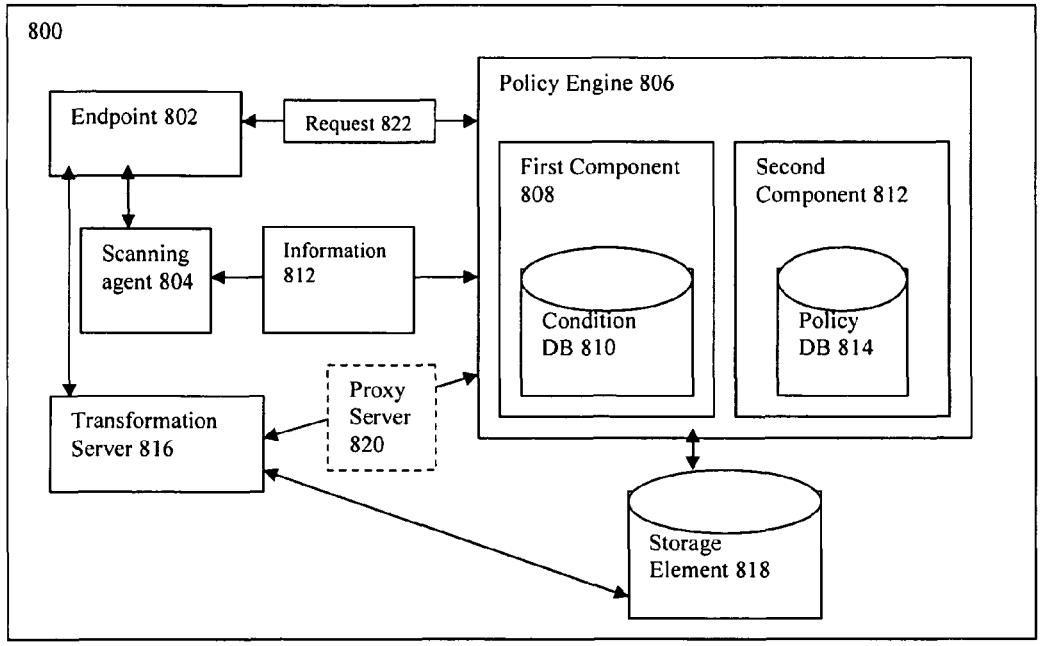
FIG. 8 is a block diagram of an embodiment of a computer network in which the network grants access to transformed content of a resource.

Referring now to FIG. 8, one embodiment of a computer network 800 constructed in accordance with the invention is depicted, which includes a endpoint 802, a scanning agent 804, a policy engine 506, a first component 808, a second component 812, a condition database 810, a policy database 812, a transformation server 816, and a storage element 818. In brief overview, when the endpoint 802 transmits a request 822 for access to a resource from the policy engine 806, the scanning agent 804 communicates with endpoint 802, retrieving information about the endpoint 802, and transmitting endpoint information 812 to the policy engine 806. The policy engine 806 makes an access control decision as discussed in FIG. 4 above. Once the policy engine 806 decides to grant the endpoint 802 access to the requested file, the policy engine 806 transmits the request to the transformation server 816 for transformation and presentation to the endpoint 802.

In more detail, the policy engine 806 receives a request from the endpoint 802 for the transformed contents of a file. In one embodiment, the policy engine 806 identifies a transformation server 816 capable of presenting the transformed contents of the file to the endpoint 802. In some embodiments, the transformation server 816 is capable of presenting the transformed contents of the file because it contains a copy of previously transformed contents. In other embodiments, the transformation server 816 is capable of presenting the transformed contents of the file because it has the capacity to transform the file contents presently.

In one embodiment, the policy engine 806 identifies a transformation server 816 by querying a storage element 818 to determine whether a transformation server 816 previously transformed the contents of the file. In that embodiment, the policy engine 806 transmits the identifier of the transformation server 818 identified by the storage element 818 to the endpoint 802. In other embodiments, no transformation server 816 has previously transformed the contents. In those embodiments, the policy engine identifies instead a transformation server 816 capable of presently transforming the contents of the file and transmits the request of the endpoint 802 to that transformation server 816.

In other embodiments, a server other than the policy engine 806 identifies the transformation server 816 capable of presenting the transformed contents of the file to the client. In some of those embodiments, that same server also transmits to the transformation server 816 the request for presentation of the file to the client. In some of these embodiments, the same server identifying the capable transformation server 816 routes transmits the request to the transformation server 816 through a proxy server.

In one embodiment, the transformation server 816 receives the request from the policy engine 806 for transformation of the contents of a requested file and presentation to the endpoint 802. In another embodiment, the transformation server 816 receives the request from the server other than the policy engine 806. The transformation server 816 retrieves the file and transforms the contents from a native format to a second format. The transformation server 816 then accepts a connection from the endpoint 802 and presents the transformed contents of the file, transforming the contents if not previously transformed. Finally, the transformation server 816 writes to the storage element 818 the identifier of the server transforming the contents of the file and the identifier of the file.

Figure 9:
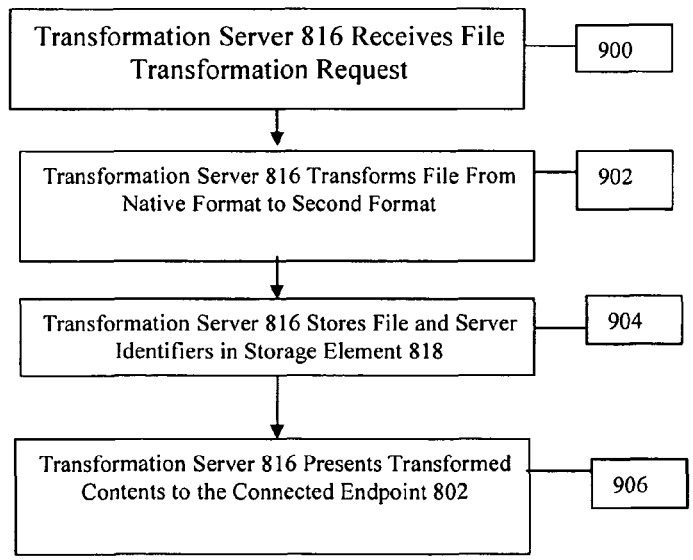
FIG. 9 is a flow diagram depicting one embodiment of the steps taken by a transformation server to transform the content of the requested file and present the transformed contents to an endpoint.

Referring now to FIG. 9, a flow diagram depicts one embodiment of the steps taken by the transformation server 816 to transform the content of the requested file and present the transformed contents to the endpoint 802.

The transformation server 816 receives the request for transformation of the contents of a requested file and presentation to the endpoint 802 (step 900). In one embodiment, the transformation server 816 receives this request over a network connection.

The transformation server 816 transforms the contents of the requested file from a native format into a second format (step 902). In one embodiment, the transformation server 816 transforms the contents of the file using regular expressions, from a native format into a second format for presentation on the client. In another embodiment, the transformation server 816 transforms the contents of the file into a second format from a native format, which contains a format conversion tool. In another embodiment, the transformation server 816 transforms the contents of the file from a native format into HTML. In another embodiment, the transformation server 816 transforms the contents of the file from a native format into a second format where the second format enables presentation on a personal digital assistant. In another embodiment, the transformation server 816 transforms the contents of the file from a native format into a second format, where the second format enables presentation on a cellular phone. In another embodiment, the transformation server 816 transforms the contents of the file from a native format into a second format, where the second format enables presentation on a laptop computer. In another embodiment, the transformation server 816 transforms the contents of the file from a native format into a second format, where the second format enables presentation at an Internet kiosk.

The transformation server 816 writes identifying information about the transformation to the storage element 818 (step 904). In one embodiment, the identifying information includes an identifier for the transformation server 816 and an identifier for the transformed file. In some embodiments, the identifying information includes a temporary file containing the transformed contents of the file. In those embodiments, the storage element 818 functions as a global cache of transformed file contents.

After the policy engine 806 identifies the transformation server 816 capable of presenting the transformed contents of the file for the endpoint 802, the policy server 806 transmits the identifier of the transformation server 816 to the endpoint 802. The endpoint 802 receives the identifier and connects to the transformation server 816. The transformation server 816 accepts the connection and presents the transformed contents of the requested file to the endpoint 802 over the connection (step 906). In one embodiment, the transformation server 816 retains the transformed contents of the requested file after the presentation to the endpoint 802.

Figure 10A:
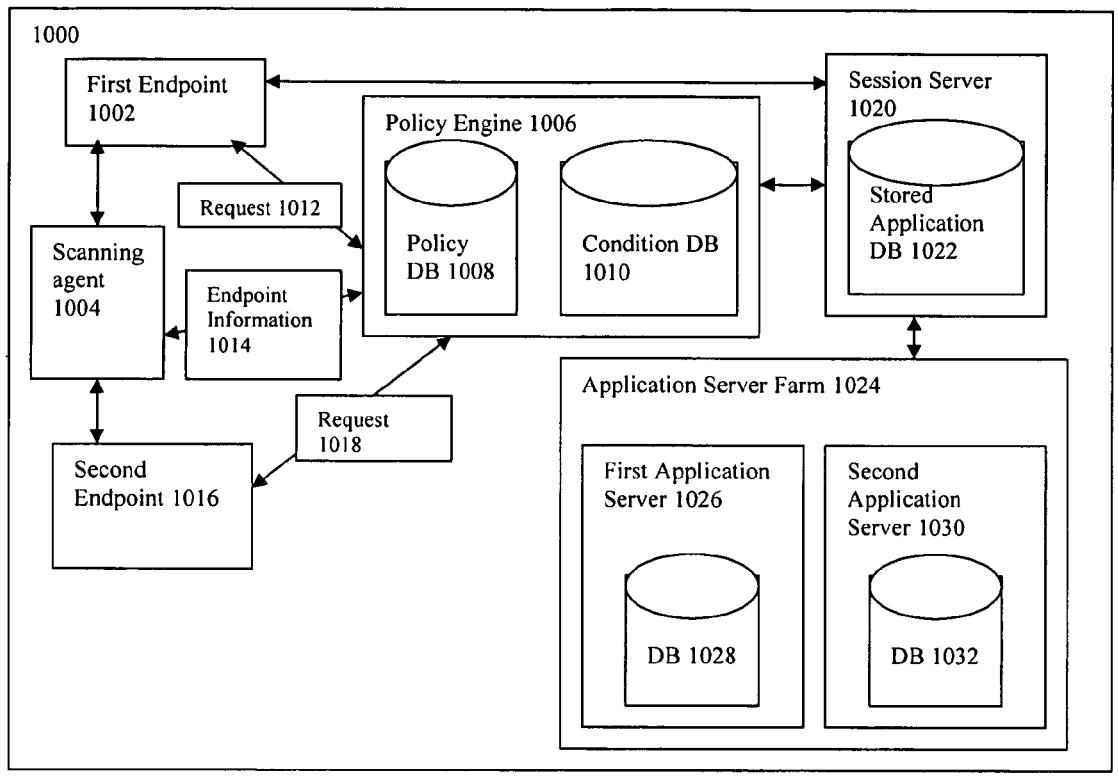
FIG. 10A is a block diagram of an embodiment of a computer network in which authorized remote access to a plurality of application sessions is provided.

Referring to FIG. 10A, one embodiment of a computer network 1000 constructed in accordance with the invention is depicted, which includes a first endpoint 1002, a scanning agent 1004, an policy engine 1006, a policy database 1008, a condition database 1010, a second endpoint 1016, a session server 1020, a stored application database 1022, an application server farm 1024, a first application server 1026, a first database 1028, a second application server 1030, and a second database 1032. In brief overview, when the first endpoint 1002 transmits to the access control server 1006 a request 1012 for access to a resource, the scanning agent 1004 communicates with endpoint 1002, retrieving information about endpoint 1002, and transmitting endpoint information 1014 to the policy engine 1006. The policy engine 1006 makes an access control decision, as discussed above in FIG. 1B. The session server 1020 establishes a connection between the endpoint 1002 and a plurality of application sessions associated with the endpoint 1002. Additional components of the computer network 1000 are omitted and will be described further in FIG. 10B.

Figure 10B:
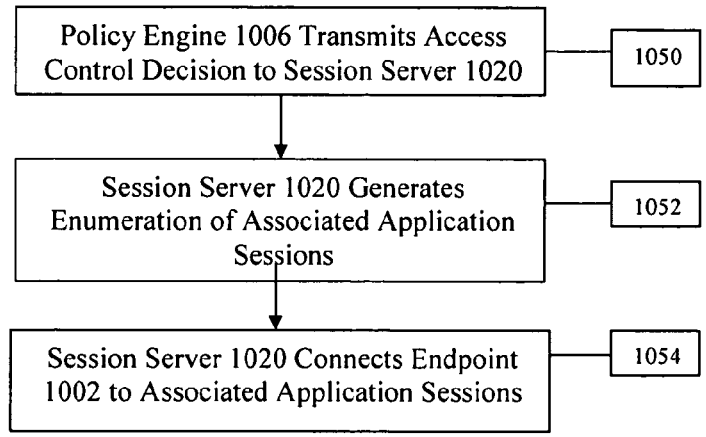
FIG. 10B is a flow diagram depicting one embodiment of the steps taken by a session server to connect a node with its associated application sessions.

Referring now to FIG. 10B, a flow diagram depicts one embodiment of the steps taken by the session server 1020 to connect the endpoint 1002 with its associated application sessions. The session server 1020 receives information about the endpoint 1002 from the policy engine 1006 containing access control decision the policy engine 1006 made (step 1050). In one embodiment, the information also includes the endpoint information 1014.

The session server 1020 generates an enumeration of associate application sessions (step 1052). In some embodiments, the policy engine 1006 identifies a plurality of application sessions already associated with the endpoint 1002. In other embodiments, the session server 1020 identifies stored application sessions associated with the endpoint 1002. In some of these embodiments, the session server 1020 automatically identifies the stored application sessions upon receiving the information from the policy engine 1006. In one embodiment, the stored application database 1022 resides on the session server 1020. In another embodiment, the stored application database 1022 resides on the policy engine 1006.

The stored application database 1022 contains data associated with a plurality of servers in the application server farm 1024 executing application sessions. In some embodiments, identifying the application sessions associated with the endpoint 1002 requires consulting stored data associated with one or more servers executing application sessions. In some of these embodiments, the session store 1020 consults the stored data associated with one or more servers executing application sessions. In others of these embodiments, the policy engine 1006 consults the stored data associated with one or more servers executing application sessions. In some embodiments, a first application session runs on a first application server 1026 and a second application session runs on a second application server 1030. In other embodiments, all application sessions run on a single application server within the application server farm 1024.

The session server 1020 includes information related to application sessions initiated by users. The session server can be stored in volatile or non-volatile memory or, for example, distributed through multiple servers. Table 10-1 shows the data included in a portion of an illustrative session server 1020.

TABLE 10-1

| Application Session | App Session 1 | App Session 2 | App Session 3 |
|---|---|---|---|
| User ID | User 1 | User 2 | User 1 |
| Client ID | First Client | | First Client |
| Client Address | 172.16.0.50 | | 172.16.0.50 |
| Status | Active | Disconnected | Active |
| Applications | Word Processor | Data Base | Spreadsheet |
| Process Number | 1 | 3 | 2 |
| Server | Server A | Server A | Server B |
| Server Address | 172.16.2.55 | 172.16.2.55 | 172.16.2.56 |

The illustrative session server 1020 in Table 10-1 includes data associating each application session with the user that initiated the application session, an identification of the client computer 1002 or 1016, if any, from which the user is currently connected to the server 1026, and the IP address of that client computer 1002 or 1016. The illustrative session server 1020 also includes the status of each application session. An application session status can be, for example, "active" (meaning a user is connected to the application session), or "disconnected" (meaning a user is not connected to the application session). In an alternative embodiment, an application session status can also be set to "executing-disconnected" (meaning the user has disconnected from the application session, but the applications in the application session are still executing), or "stalled-disconnected" (meaning the user is disconnected and the applications in the application session are not executing, but their operational state immediately prior to the disconnection has been stored). The session server 1020 further stores information indicating the applications 116 that are executing within each application session and data indicating each application's process on the server. In embodiments in which the server 1026 is part of a server farm 1024, the session server 1020 is at least a part of the dynamic store, and also includes the data in the last two rows of Table 10-1 that indicate on which server in the server farm each application is/was executing, and the IP address of that server. In alternative embodiments, the session server 1020 includes a status indicator for each application in each application session.

For example, in the example of Table 10-1, three application sessions exist, App Session 1, App Session 2, and App Session 3. App Session 1 is associated with User 1, who is currently using terminal 1. Terminal one's IP address is 152.16.2.50. The status of App Session 1 is active, and in App Session 1, a word processing program, is being executed. The word processing program is executing on Server A as process number 1. Server A's IP address is 152.16.2.55. App Session 2 in Table 1 is an example of a disconnected application session 1110. App Session 2 is associated with User 2, but App Session 2 is not connected to a client computer 1002a or 1016. App Session 2 includes a database program that is executing on Server A, at IP address 152.16.2.55 as process number 3. App Session 3 is an example of how a user can interact with application sessions operating on different servers 1026. App Session 3 is associated with User 1, as is App Session 1. App Session 3 includes a spreadsheet program that is executing on Server B at IP address 152.16.2.56 as process number 2, whereas the application session included in App Session 1 is executing on Server A.

In one embodiment, the session server 1020 is configured to receive a disconnect request to disconnect the application sessions associated with the endpoint 1002 and does so disconnect the application sessions in response to the request. The session server 1020 continues to execute an application session after disconnecting the endpoint 1002 from the application session. In this embodiment, the session server 1020 accesses the stored application database 1022 and updates a data record associated with each disconnected application session so that the record indicates that the application session associated with the endpoint 1002 is disconnected.

Unintentional termination of application sessions resulting from imperfect network connections and users' failure to terminate their application sessions themselves can lead to user difficulties. One embodiment of the invention limits these difficulties by differentiating disconnection (which is treated as if the user is not done working with an application session) from termination (which is assumed to be an intentional end to the application session) and by correlating application sessions with users as opposed to endpoints. When a user is finished using an application operating in an application session, the user can terminate an application session. Termination generally involves the affirmative input of the user indicating that the server should no longer maintain the application session. Such affirmative user input can include selecting an "Exit" option from a menu, clicking on an icon, etc. In response to the session server 1020 receiving a termination request, the execution of the application session and any application within that application session is halted. In one embodiment, data related to the application session is also removed from the stored application database 1022.

Disconnection, either intentional or unintentional, on the other hand, does not result in termination of application sessions. Since the application or applications operating in an application session are executing on the server 1020, a connection to the first endpoint 1002 is not usually necessary to continue execution of the applications, and in one embodiment the applications can continue to execute while waiting for the user to connect. In an alternative embodiment, upon disconnection of a user, the session server 1020 stalls the execution of the applications operating in the application session. That is, the session server 1020 halts further execution of the applications, and the session server 1020 stores the operational state of the application and any data the application is processing. In a further embodiment, the session server 1020 can selectively stall execution of specific applications after a user disconnects. For example, in one embodiment, the session server 1020 continues execution of an application for a fixed time period, and if a user fails to connect within that time period, the session server 1020 stalls the application. In another embodiment, the session server 1020 stalls specified application sessions that cannot continue executing without user input. In each of the above-described embodiments, if the user of the first endpoint 1002 disconnects from the server 1026 and then connects to the server 1026 while operating the first endpoint 1002, the second endpoint 1016, or a third client computer, the session server 1020 can connect the client computer operated by the user to one or more previously initiated, non-terminated application session(s) associated with the user, and reinitiate execution of any stalled applications.

In one embodiment, the session server 1020 detects a disconnection. A user can intentionally and manually instruct the server to disconnect an application session from the endpoint 1002 or 1016 that the user is communicating from. For example, in one embodiment, application sessions provide a menu option for disconnection (as distinguished from termination above) that a user can select. The session server 1020 can also detect an unintentional disconnection. For example, in one embodiment, session server 1020 identifies when a predetermined number of data packets transmitted to a endpoint 1002 or 1016 have not been acknowledged by the endpoint 1002 or 1016. In another embodiment, the endpoint 1002 or 1016 periodically transmits a signal to the server 1026 to confirm that a connection is still intact. If the session server 1020 detects that a predetermined number of expected confirmation signals from a endpoint 1002 or 1016 have not arrived, session server 1020 determines that the endpoint 1002 or 1016 has disconnected. If the session server 1020 detects that a user has disconnected from an application session, either intentionally, or unintentionally, the entry in the session server 1020 related to the disconnected application session is modified to reflect the disconnection.

After receiving authentication information, the session server 1020 consults the stored applications database 1022 to identify any active application sessions that are associated with the user, but that are connected to a different endpoint, such as the first endpoint 1002, for example. In one embodiment, if the session server 1020 identifies any such active application sessions, the session server 1020 automatically disconnects the application session(s) from the first endpoint 1002 and connects the application session(s) to the current endpoint 1016 (step 1054). In some embodiments, the received authentication information will restrict the application sessions to which the endpoint 1002 may reconnect. In one embodiment, the user can trigger the automatic consultation of the session server and subsequent connection with the selection of a single user interface element.

After identifying the application sessions associated with the endpoint 1002, the session server 1020 connects the endpoint 1002 to associated application sessions. The session server 1020 determines whether each application session in the plurality is active or disconnected. In one embodiment, at least one application session in the plurality is active. In one embodiment, at least one application session in the plurality is disconnected. In one embodiment, the session server 1020 receives the application output automatically. In another embodiment, receipt of the application output is triggered by endpoint 1002 selection of a single user interface element. The session server 1020 identifies disconnected application sessions to which to reconnect the endpoint 1002 based upon the access control decision contained in the received information 1014. In one embodiment, upon identifying any disconnected application sessions, the session server 1020 prompts the user to indicate whether connection is desired. If connection is not desired, the session server 1020 prompts user to indicate whether the disconnected applications sessions should remain disconnected, or whether the application sessions should be terminated.

In one embodiment, connection includes modifying the entry in the stored applications database 1022 to indicate that the user is connected to the application session and to indicate from which endpoint 1002 the user is connected to the server. Upon connection, the server 1026 resumes transmitting application output data to the endpoint 1002 or 1016. In one embodiment, the plurality of application sessions associated with the endpoint was connected to the first endpoint 1002 prior to connection and, after connection the plurality of application sessions is reconnected to the first endpoint 1002. In another embodiment, the plurality of application sessions associated with the endpoint 1002 was connected to the first endpoint 1002 prior to connection and, after connection the plurality of application sessions is reconnected to the second endpoint 1016.

The following illustrative examples show how the methods and apparatus discussed above can be used to provide policy-based access to file contents for an endpoint 102. These examples are meant to illustrate and not to limit the invention.

Evidence Collection

In one embodiment, an endpoint 102 requests access to a word processing document located on a server residing on the same network as the policy engine 156 resides. The policy engine 156 receives the request and determines that it possesses no information about endpoint 102. The policy engine 156 transmits a scanning agent 104 to the endpoint 102. In some embodiments, the scanning agent 104 has pre-defined information to collect from the endpoint 102. In other embodiments, the scanning agent 104 first analyzes the endpoint 102 to determine what type of information to collect. In still other embodiments, the scanning agent 104 retrieves from the policy engine 156 the instructions as to what information to collect about the endpoint 102.

Once executing on the endpoint 102, the scanning agent 104 gathers the required information and transmits the information 112 to the policy engine 156. The policy engine 156 receives the information 112 and begins the process of determining what conditions the information 112 satisfies. In some embodiments, the policy engine 156 determines that the received information 112 does not suffice to determine whether the information 112 satisfies one or more conditions. In those embodiments, the policy engine 156 transmits further instructions to the scanning agent 104 for gathering more information about the endpoint 102.

Policy-Based Access Control

As the first component 152 of the policy engine 156 determines that one or more conditions are satisfied, it stores an identifier for each satisfied condition in a data set. Upon completion, the first component 152 transmits the data set and the requested application to the second component 160. In an example of this embodiment, the requested application may be a word processing document and the conditions satisfied may indicate that the client device is a personal digital assistant. In another example of this embodiment, the requested application may be a spreadsheet and the conditions satisfied may indicate that the client device is a trusted laptop connecting from an insecure network such as a public internet kiosk. In a third example of this embodiment, the requested application may be a file attached to an electronic mail message and the conditions satisfied may indicate that the client device is on a personal desktop connecting from a secure network but lacking the appropriate application software to view the file.

The second component 160 receives the data set from the first component 152 and applies one or more policies to the received data. In one example of this embodiment, the second component 160 may apply a policy requiring that when a client device type is a personal digital assistant if the condition that the endpoint have on it application software is not satisfied, the endpoint 102 receive the transformed contents of the file. The endpoint 102 would then receive an executable file enabling connection to a transformation server, which will present the contents of the file in a format accessible to the client device type. Applying this policy enables the endpoint 102 to view the contents of the file in spite of inappropriate form factor for viewing content.

In another example of this embodiment, the second component 160 may apply a policy prohibiting download to the endpoint 102 when a client device type is a trusted laptop, containing the appropriate application software, but from an insecure network such as an Internet kiosk. In this embodiment, the policy might require that the policy engine 156 transmit an executable file to the endpoint 102 enabling connection to an application server 416 for presentation of the file contents. Applying a policy of this type, and retrieving the file only to the protected server 116, enables the endpoint 102 to view the contents of the file without jeopardizing the proprietary contents of the file from inappropriate dissemination.

In yet another example of this embodiment, the second component 160 may apply a policy requiring that a personal desktop making a secure connection, but lacking appropriate application software, connect to an protected server 116 via an ICA session, and that the protected server 116 execute the appropriate application and present the file to the endpoint 102. Applying the policy enables the endpoint 102 to view the contents of the file regardless of the lack of application software on the endpoint 102.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of granting a node operated by a user access to resources based on information about the node, comprising:
   (a) receiving, by a receiver of a gateway, a request from a node operated by a user to access a resource;

(b) generating, by an agent constructor of the gateway, a scanning agent to gather information about the node;

(c) generating, by a key generator of the gateway, at least one key;

(d) embedding, by an encryption function generator of the gateway, in the scanning agent the at least one generated key;

(e) transmitting, by a transmitter of the gateway, the scanning agent to the node;

(f) encrypting, by the scanning agent, gathered information about the node using the at least one generated key;

(g) decrypting, by a decryptor of the gateway, the encrypted gathered information; and (h) receiving, by a first component of a policy engine of the gateway, the decrypted gathered information, and generating a dataset comprising a plurality of identifiers, each of the plurality of identifiers identifying a respective condition satisfied by the gathered information;

(i) granting, by a second component of the policy engine, one of a plurality of levels of access to the node to access the resource responsive to application of a policy to the generated dataset.

2. The method of claim 1, wherein step (a) further comprises receiving the request via a network connection.

3. The method of claim 1, wherein step (b) further comprises selecting, for execution on the node, a subset of scan routines from a plurality of available scan routines.

4. The method of claim 1, wherein step (c) further comprises generating a shared secret key.

5. The method of claim 1, wherein step (c) further comprises generating a public key and a private key.

6. The method of claim 5, wherein step (f) further comprises encrypting the gathered information with the generated public key.

7. The method of claim 5, wherein step (g) further comprises decrypting the encrypted gathered information with the generated public key.

8. The method of claim 1, wherein step (d) further comprises obfuscating the scanning agent.

9. The method of claim 1, wherein step (h) further comprises gathering the information across a network connection.

10. The method of claim 1, wherein step (h) further comprises gathering information about the node including at least one of: operating system type, device type, machine identification number, installed software, Active Directory membership, network connection information, Media Access Control address of an installed network card, operating system patch, software patch, digital watermark, virus scanner and firewall.

11. The method of claim 1, wherein step (i) further comprises decrypting the encrypted gathered information with the at least one generated key.

12. A system of granting a node operated by a user access to resources based on information about the node via an access gateway comprising:

a receiver, receiving a request from a node operated by a user to access a resource;

an agent constructor, generating a scanning agent for gathering information about the node;

a key generator, in communication with the receiver and the agent constructor, generating at least one key;

a encryption function generator, in communication with the agent constructor and the key generator, embedding the at least one generated key in the generated scanning agent;

a decryptor, receiving encrypted gathered information about the node and decrypting the gathered information;

a first component of a policy engine, receiving the decrypted gathered information and generating a dataset comprising a plurality of identifiers, each of the plurality of identifiers identifying a respective condition satisfied by the gathered information; and a second component of the policy engine, granting one of a plurality of levels of access to the node to access the resource responsive to application of a policy to the generated dataset.

13. The system of claim 12, wherein the agent constructor selects a subset of a plurality of scan routines for execution on the requestor.

14. The system of claim 12, wherein the agent constructor obfuscates the program code of the scanning agent.

15. The system of claim 12, wherein the agent constructor further comprises a transmitter for transmitting the generated scanning agent to the requester.

16. The system of claim 12, wherein the encryption function generator provides functionality for encrypting data with a generated key.

17. The system of claim 12, wherein the receiver receives encrypted gathered information from the scanning agent and transmits the received encrypted gathered information to the decryptor.

18. The system of claim 12, wherein the key generator further comprises generating a shared secret key.

19. The system of claim 12, wherein the key generator further comprises generating a public key and a private key.

20. The system of claim 12, further comprising a policy engine applying a policy to the received gathered information.

21. A system of granting a node operated by a user access to resources based on information about the node via an access gateway comprising:

means for receiving a request from a node operated by a user to access a resource;

means for generating a scanning agent for gathering information about a configuration of the node;

means for generating at least one key;

means for embedding the at least one generated key in the generated scanning agent;

means for receiving encrypted gathered information about the configuration of the node and decrypting the gathered information;

means for receiving, by a policy engine, the decrypted gathered information and generating a dataset comprising a plurality of identifiers, each of the plurality of identifiers identifying a respective condition satisfied by the gathered information; and means for granting, by the policy engine, one of a plurality of levels of access to the node to access the resource responsive to application of a policy to the generated dataset.

22. The system of claim 21, wherein the gathered information comprises at least one of: operating system type, device type, machine identification number, installed software, Active Directory membership, network connection information, Media Access Control address of an installed network card, OS patch, software patch, digital watermark, virus scanner and firewall.

* * * * *